United States Patent [19]

Blackburn et al.

[11] Patent Number: 4,535,411
[45] Date of Patent: Aug. 13, 1985

[54] FIELD BALANCING APPARATUS

[75] Inventors: Bobby J. Blackburn, Columbus; John M. Csokmay, Johnstown, both of Ohio

[73] Assignee: IRD Mechanalysis, Inc., Columbus, Ohio

[21] Appl. No.: 443,541

[22] Filed: Nov. 22, 1982

[51] Int. Cl.³ ............................................. G01M 7/00
[52] U.S. Cl. .................................. 364/508; 364/550; 73/570; 73/602
[58] Field of Search ............... 364/508, 550, 554, 507; 73/570, 577, 602, 618; 346/7

[56] References Cited

U.S. PATENT DOCUMENTS

| | | | |
|---|---|---|---|
| Re. 31,750 | 11/1984 | Morrow | 364/508 |
| 4,302,813 | 11/1981 | Kurihara et al. | 364/508 |
| 4,352,293 | 10/1982 | Kurihara et al. | 364/508 X |
| 4,399,513 | 8/1983 | Sullivan et al. | 364/508 X |
| 4,408,285 | 10/1983 | Sisson et al. | 364/508 |
| 4,435,770 | 3/1984 | Shiohata et al. | 364/508 |

Primary Examiner—Edward J. Wise
Attorney, Agent, or Firm—Mueller and Smith

[57] ABSTRACT

Apparatus for carrying out the field balancing of rotors utilizing trial weight techniques. A display is provided with the portable apparatus which serves to prompt the operator with respect to proper procedures for 1 and 2-plane balancing. The apparatus further incorporates a non-volatile random access memory in which balancing parameters for a number of rotors may be permanently stored for use in subsequent trim balancing procedures. This same non-volatile memory is utilized additionally for the storage of null and gain categorized calibration data. A synchronous form of filter is provided for balancing which additionally is used for the purpose of aiding the operator in carrying out vibrational analysis in the field.

20 Claims, 23 Drawing Figures

Microfiche Appendix Included
(1 Microfiche, 27 Pages)

FIELD BALANCING APPARATUS

MICROFICHE APPENDIX

A microfiche appendix having one microfiche and 27 frames is submitted with the record hereof.

BACKGROUND

The balancing of rotational components in various mechanical devices and systems has been a subject of investigation and development throughout modern industrial history. Where rotary components operate under conditions of balance falling within acceptable performance parameters, their efficiency and operational life spans are considerably improved. Thus, industry has recognized the cost justification of accepting machinery down time and labor cost penalties associated with the carrying out of rotor component balancing.

For example, large, material moving fans often find service within hostile, corrosive environments. They become unbalanced very often in consequence of the loss of pieces of blades. To maintain them in service, the fans are stripped down, rebalanced and returned to service. As a result, bearing damage or the like is essentially prevented and the life spans for the fans are extensible until such times as they are incapable of maintaining desired fluid flow.

A broad variety of rotor balancing techniques have been evolved by industry. An important one of these techniques look to a mathematically based evaluation of unbalance generated rotor vibration wherein product detection procedures are carried out to determine vector representation signals of unbalance. From these signals, the amount and position of correctional weight adjustment may be derived.

One category of balancing devices is concerned with "dedicated" balancing machines. These machines operate in conjunction with somewhat elaborate supports or pedestals having carefully predetermined geometries and rotor bearing characteristics upon which the rotor component desired to be balanced is mounted. Employing either displacement or thrust transducers at specific positions or "planes", as well as phase or rotational position monitors, the rotational manipulation of the rotor to be balanced in conjunction with calibration procedures produces vector categorized signals. These signals are operated upon by any of a broad variety of computational systems to generate appropriate balancing information.

Generally, the above-described dedicated balancing devices are installed in somewhat permanent or semi-permanent plant locations such that the rotational components of remote machinery installations must be removed and transported varying distances for access to the balancing services. Of course, such procedures involve the expense of rotor transportation and extended down times.

These expenses have led industry to resort to the use of less accurate but portable vibration analyzing instruments for providing balance correction at the situs of the equipment. The use of vibration analyzers for this purpose of balancing rotors generally has required that personnel in the field carry out a sequence of relatively extended procedures and mathematical computations. In consequence, a human error factor enters the procedure and the time heretofore required for carrying out such in situ balancing becomes somewhat extended.

The vibration analyzers involved in this field procedure generally are tunable filters operating in conjuction with strobe lights and vibration transducers or pick-ups. With the procedure, the operator provides some form of reference mark which rotates with the rotor being balanced, applies the vibration transducers at locations adjacent the planes at which correction will be applied, and then carries out a sequence of analytical steps. These steps involve, for example, causing the rotor to operate at working speed and recording resultant vibration data; stopping the rotor and applying a trial weight at a correction plane, again starting the rotor up to operational speed; stopping the device and duly recording the vibrational values observed. During these runs, the position of the rotational indicia as frozen in position by the strobe is observed and this estimated information is written down. The operator then carries out a relatively involved series of mathematical tasks including a graphic determination of vectors. Correctional weights and orientations with respect to the reference indicia then are determined, the rotor is adjusted accordingly and, hopefully, balance within acceptable specifications is achieved. As is usually the case, this balancing is carried out in at least two planes which involves a further repetition of most of the above steps. In the past, where corrective balance remained inadequate, then the procedures as described above would be fully repeated, resulting in further extended down times and labor costs. In effect, there was no "trim" capability with the use of vibration analyzers in the field for balancing purposes. Such trim practices permit the additional correction for balance without the repetition of calibrating runs and the like. The technique involved has been in use for a considerable period of time. In this regard, the reader's attention is directed to a publication entitled "Dynamic Balancing of Rotating Machinery in the Field" by E. H. Thearle, Transactions of the American Society of Mechanical Engineers, October, 1934, No. 743.

Some improvement in the rapidity and accuracy of calculation has been achieved through the introduction of programmable portable calculating devices. With such devices, the mental and graphical mathematical steps are carried out automatically, however, the insertion of data still remains a manual task and, importantly, the visual observation of displacement of a reference mark utilizing the strobe represents a technique highly susceptible to error.

For any of the field balancing techniques qualified personnel are required, and the typical problems of human error persist. Because a number of steps are required to carry out balancing, particularly where additional trim balancing procedures are encountered, error readily may enter into the proper sequencing procedure itself to substantially negate the operator's efforts. Further, the entire sequential procedure of analysis must be repeated for each machine upon every return of the operator to the field. This necessarily entails the expenditure of considerable time with the consequent elevation of maintenance costs.

SUMMARY

The present invention is addressed to apparatus for carrying out the field balancing of rotors which incorporates a display and switching arrangement providing tutorial prompts to the operator to assure more efficient performance. Utilizing a trial weight system for balancing, the program of the apparatus not only computes balancing correctional data but also provides for the carrying out of time saving trim balancing techniques. Of particular advantage, the apparatus incorporates a non-volatile random access memory facility providing for the select storage of balancing trim parameters for a relatively large number of rotors. Thus, once the balancing parameters have been established for a given rotor, these parameters may be retained in non-volatile memory for select use as the rotor again is approached for balancing. Generally, with such an arrangement, the operator need only carry out one spinning of the rotor at balancing speed along with observation of attendant display readouts to provide for rotor balance. The apparatus also uniquely provides a second use for the non-volatile random access memory by utilizing locations therewithin to store calibration data. Thus, the apparatus is easily factory calibrated without resort to the use of potentiometers and the like generally associated with networks requiring gain or null adjustment procedures.

Another object of the invention is to provide apparatus for balancing an identifiable rotor utilizing vibration responsive transducers having vibration responsive output signals as well as a rotation transducer providing rotation responsive signals corresponding with a reference location of a rotor, the apparatus further selectively utilizing trial weight balancing techniques in conjunction with a given rotor. Means are provided for receiving the vibration responsive output signals as well as the rotational responsive signals and an analyzer network is provided which is responsive to these signals and which includes a filter synchronous with respect to the rotation responsive signals for deriving vector categorized signals corresponding with amplitude and phase of vibration related to the reference location of the rotor. A hold switch arrangement is provided for selectively deriving a data accept condition. Function switching is provided which is actuable to effect a balance condition and a memory switching arrangement is provided which is actuable to effect store and recall conditions. In addition to a display providing a visible readout of information, the apparatus further includes a random access memory and the above-noted non-volatile random access memory for retaining balance parameter data at discrete identifiable locations in the absence of applied electrical power. A processor is provided which is responsive to first of the vector categorized signals derived from an initial rotation of the rotor when the function switching arrangement is in its balance condition and the hold switch is in the data accept condition to effect the submittal of the first signals to random access memory. The processor further is responsive to second vector categorized signals derived from next rotation of the rotor with a trial balance weight connected therewith when the function switching arrangement is in the balance condition and the hold switch is in a data accept condition for effecting the submittal of the second signals to random access memory, for computing balance correction parameters with respect to the first and second signals and for effecting readout of balance correction information corresponding therewith at the display and the processor is subsequently responsive to actuation of the memory switching arrangement to its store condition for effecting the storage of the computed balance correction parameters in non-volatile memory.

As a further object and feature of the invention, the processor of the apparatus further is responsive to the memory switching recall condition and the function switching balance condition for effecting the transfer of select computed balance correction parameters from the non-volatile memory to random access memory and is subsequently responsive to third vector categorized signals derived from a third rotation of the rotor when the hold switch is in its data accept condition for effecting the submittal of the third signals to random access memory, for computing trim balance correction prameters with respect to the third signals and the balance correction parameters from the non-volatile memory, and for effecting the readout of the trim balance correction information corresponding therewith at the display.

Other objects of the invention will, in part, be obvious and will, in part, appear hereinafter. The invention, accordingly, comprises the apparatus possessing the construction, combination of elements and arrangement of parts which are exemplified in the following detailed description.

For a fuller understanding of the nature and objects of the invention, reference should be had to the following detailed description taken in conjunction with the accompanying drawings.

DETAILED DESCRIPTION

Figure 1:
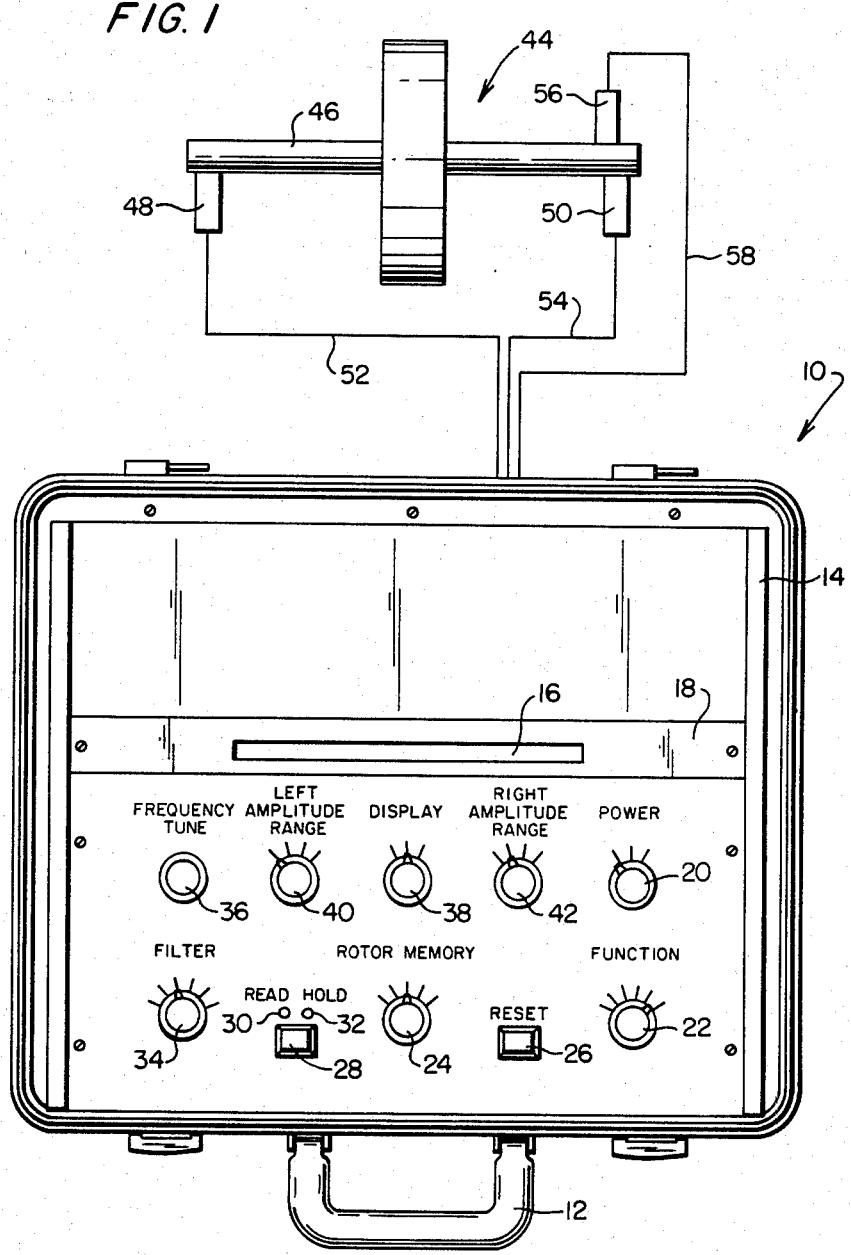
FIG. 1 is a top view of field balancing apparatus according to the invention showing its use in conjunction with a schematically portrayed rotor and transducers.

Looking to FIG. 1, an instrument for carrying out rotor balancing as well as vibrational analysis of machinery in the field is revealed generally at 10. Instrument 10 is portable, weighing, for example, about 40 pounds, and thus is carried by the operator via a handle 12 from one machinery location to the next in the course of a preventive maintenance program. For purposes of transportation, the display and hand actuated control components of the instrument are protected by a rigid cover (not shown) which is removed at the machine site to reveal a control panel as is illustrated at 14 in the figure. Panel 14 is shown to contain a singular, elongate rectangular readout or display 16 which preferably is provided as a high intensity, vacuum-fluorescent, illuminated screen capable of providing a 40-character alpha-numeric display. To facilitate its readability, the display 16 is positioned on an angularly oriented portion 18 of the panel 14.

The actuating or hand manipular implements made available to the operator at panel 14 include, inter alia, a power switch 20 which serves a conventional powering up function either via a line power source or a separately carried battery power pack. As indicated earlier herein, instrument 10 enjoys a functional versatility permitting it to carry out rotor balancing as well as vibrational analysis. The operator selection of the particular aspect of machinery investigation is provided by a function switch 22. By appropriately manipulating this switch, the operator may select one or two plane balancing procedures of a variety utilizing a trial run in conjunction with trial weights. Another position of switch 22 related to balancing is identified as "STATIC COUPLE" which provides a total static sum readout based upon the correction information achieved during two plane balancing operations. Similarly, a "STATIC COUPLE VIBRATION" position is provided for the switch which operates upon left and right vibration signal components to provide sum and difference of vibration readouts. Another position of the function switch is that entitled "VIBRATION" which causes the instrument 10 to operate to provide information permitting the operator to carry out vibration analysis of a machine. Finally, the switch 22 may be moved to a "TEST" position wherein a test may be carried out in the field to determine the validity of the orientations of the switches within panel 14, cable connections and other switch components.

Where one and two plane balancing procedures are carried out, the operator generally will resort to the operation of a rotor memory switch 24 which is positionable from an "OFF" orientation to positions designated "ROTOR NUMBER" and "STORE" which are used to carry out the submission of one or two plane balancing parameters derived from initial and trial weight runs, which may be categorized as vector operators, to non-volatile memory storage. The "ROTOR NUMBER" position serves to select that place in any of an available 35 memory locations within which to store data and the "STORE" position of the switch provides an entry function. Generally, the information stored includes the rpm values used during a balancing procedure as well as an identification as to whether the balancing was one or two plane in scope. The oppositely directed positions of switch 24 include locations providing for "ROTOR NUMBER" wherein memory position is located and a recall position wherein balancing parameters already in memory may be utilized for carrying out trim balancing procedures.

Generally, the function switch 22 and rotor memory switch 24 operate in conjunction with a "RESET" switch 26 and a two position push-button "READ-HOLD" switch 28 which may be alternately actuated to cause the instrument 10 to operate in a read or alternately a hold mode, which modes are visually represented by the energization of respective LEDs 30 or 32 positioned above the switch. Generally, when operating in a read mode, the instrument 10 is in a state of collecting data, while conversely, in a hold mode is in a data accept or state of submitting the thus-collected data to a random access memory function. The reset switch serves generally to provide a restart function in conjunction with balancing procedures.

A filter selector switch 34 is provided in the lower grouping of switches and this switch has several selectable orientations including a "TRACK" position which provides for vibration monitoring with respect to dual channels in synchronization with rotational speed. The position is used principally for balancing functions. Switch 34 includes three positions for manual tuning based upon frequency ranges of 60 to 1K CPM, 600 to 10K CPM or 6K to 100K CPM for use in vibrational analysis in combination with a frequency tune control 36 which is provided, for example, as a potentiometer. By appropriate manipulation of the control knob 36, the internal filter can be tuned through the above-noted frequency ranges to detect vibration peak frequencies. Actuation of the knob 36 is carried out in conjunction with observing a readout at the display 16. Switch 34 also contains "DISPLACEMENT OUT" and VELOCITY OUT" positions wherein the unfiltered vibration amplitude for any input channel may be read out from display 16 in conjunction with rotational and phase data. The type of readout is one of overall amplitude generally representing a form of average evaluation.

A display form selection switch is provided at 38 which is a three position rotary device utilized to select either a digital or an analog readout at display 16. In the former regard, the display provides a digital readout in conjunction with the "DIGITAL" switch position which is generally utilized in balancing and to provide precise values of vibration amplitudes and phase angles. This information is provided for two channels of readout designated right and the left.

The switch 38 further is structured having "ANALOG RIGHT" and "ANALOG LEFT" designated positions which are utilized in vibration analysis where resulting amplitude readings may be erratic in nature. For this purpose, an analog-bar graph display is provided in conjunction with an hour number-type phase readout. Left and right amplitude range switches shown respectively at 40 and 42 further are provided at panel 14. These switches each have level positions which may be identified as "AUTO" "LOW" "MID" and "HIGH". The automatic positions for each of a right or left channel generally are utilized in measuring the earlier-discussed overall vibration amplitudes, as well as when balancing to obtain automatic selection of overlapped amplitude ranges. During range changing intervals, the letter R is shown as a readout within the display 16. The level positions of the switches correspond with fixed amplitude ranges wherein "LOW" is considered as having a range of 0 to 48.0 micrometers, "MID" is designated having a range of 0.0 to 480 micrometers and "HIGH" is designated as having a range of 0 to 5050 micrometers. Where vibration amplitude exceeds the high end of the select ranges, the overload symbol "O/L" is displayed at readout 16.

Other switch arrangements are included within instrument 10, for example, a unique form of factory calibration of the instrument is achieved through the use of binary switches, a damping selector switch and a mode selecting switch are incorporated within the instrument to provide for selection of readouts in either English or metric units.

Instrument 10 is illustrated in FIG. 1 as being operationally associated with a schematically depicted rotor component 44 of a given machine under test. Rotor 44 is shown having a shaft 46, the oppositely-disposed ends of which are assumed, for example, to be at bearing planes or the like representing the planes about which balancing and/or vibrational analysis may be carried out. In conventional fashion, transducers or pick-ups which, for example, provide signals corresponding with vibrational velocity, acceleration or displacement are positioned in fixed contact with a portion of the machine. Generally, this portion will be a bearing cap or housing or the like. The transducers are positioned in accordance with a left-right industry convention, the left transducer being shown at 48 and the right transducer being shown at 50. Transducers 48 and 50 are coupled by suitable cable connections represented, respectively, by lines 52 and 54 to the input receptacles of instrument 10. For balancing purposes, preferably the transducers used as at 48 and 50 will be provided as a velocity pickup device. For example, such a pickup device may be provided as a Model 544 Seismic Velocity Transducer marketed by IRD Mechanalysis, Inc., Columbus, Ohio. An accelerometer suited for utilization with the instrument 10 may be provided, for example, as a Model 970 Accelerometer marketed by IRD Mechanalysis, Inc. (supra) and a displacement form of pickup may be, for example, provided as a Model 403 Non-contact Pickup System operating on an eddy current loss principle and marketed by IRD Mechanalysis, Inc. (supra). In addition to the vibrational data submitted from transducers 48 and 50, the rotational rate of the shaft 46 is monitored by a transducer 56 which conventionally is provided as a photocell acutated device operating in conjunction with a small piece of reflective tape located upon shaft 46 at an arbitrarily designated 0° position. These rotational data are represented as being submitted to instrument 10 via line 58. The rotational rate sensing device 56 may be provided, for example, as a retro-reflective device identified as a Model 21000 marketed by IRD Mechanalysis, Inc. (supra).

In carrying out, for example, a two plane balancing procedure utilizing instrument 10, the operator positions function switch 22 at a two plane balance orientation, filter switch 34 at a "TRACK" orientation, display switch 38 at a digital readout position and, of course, provides power by actuation switch 20. In response to power up, the instrument 10 will carry out initialization procedures and provide a sign-on message as a readout at display 16. Assuming an original balancing operation is being carried out, the instrument will prompt the operator by requiring an acknowledgment that two plane balancing is requested, this being a dual request that the reset switch 26 be actuated. Following such actuation, a series of prompt messages appear at display 16 instructing the operator to cause the rotor 44 to spin at the desired test rate. The prompt message further provides that the operator is to "HOLD" the readings and this is carried out by actuation of switch 28. This causes the submittal of the initial run vibrational data to random access memory. As a last portion of the message, the operator is told to stop the rotor. Instrument 10 then instructs or prompts the operator to carry out the next step in balancing by adding a trial weight at the left plane zero position aligned with the mark initialized with photoresponsive transducer 56 and to cause the rotor 44 to be brought to speed, the readings to be held when stable by actuation of switch 28 and finally to bring the rotor to a stop and remove the trial weight. The same procedure with appropriate prompting then takes place with respect to the right balance plane. Balance parameters developed during these procedures are submitted to random access memory for temporary storage in conjunction with the actuation of switch 28. Instrument 10 then provides a balance correction message at display 16 advising that the trial weights are to be removed from (left and right) the right plane and a correction is given in terms of phase position for correction and a percentage valuation of trial weight to be added is indicated for both right and left planes. The operator then makes a determination as to whether the correctional weights added or removed are appropriate to achieve sufficient machine balance. Specifications in this regard will vary from machine to machine. However, the instrument 10 now is in a trim balance mode wherein additional corrections may be read out by simply spinning up rotor 44 to the testing speed and observing the readout at display 16. Assuming that appropriate balance has been achieved, the operator may provide for the storage of balancing parameters in permanent memory and this is carried out by actuating switch 24 to cause the instrument to "SCROLL" through 35 possible memory locations which are identified by number at display 16. This display also will indicate whether or not any given memory location already contains data. If not, then by acutating switch 24 to a store position, permanent retention of the balancing parameters in memory may be provided. On the other hand, at a later time, when the same rotor is being balanced again, switch 24 may be actuated to a rotor number position which causes a scrolling of the memory locations to occur until the earlier location wherein data has been stored is reached. By manipulating switch 24 to the recall position, then that data is transferred to random access memory and trim balancing may again take place at this later point in time without resort to again carrying out rotation using trial weights, only an initial operation of rotor 44 being required to provide a readout of required balancing correction at display 16.

The correction information provided during the balancing techniques may be converted to static couple information by the manipulation of switch 22 to the "STATIC COUPLE" orientation. Similarly, vibration analysis is carried out by manipulation of switch 22 to its "VIBRATION" orientation along with an appropriate selection of filter switch 34 orientations. The amplitude range switches 40 and 42 may be utilized in conjunction with vibration analysis to permit the operator to lock the instrument 10 into a particular amplitude range. Normally automatic amplitude ranging takes place, however, in many instances, as an operator is tuning through a given amplitude range band, a vibration level is reached that exceeds an earlier band and the instrument 10 will react by automatically skipping to a next less sensitive band. This requires an expenditure of time, the operator having to wait until the instrument stabilizes. It becomes more difficult to carry out tuning procedures, if the system must continually alter ranges on its own initiative. Thus the instant option provided by switches 40 and 42 serves to lock the control system into a given band and provide more simplified tuning within a range.

Figure 2:
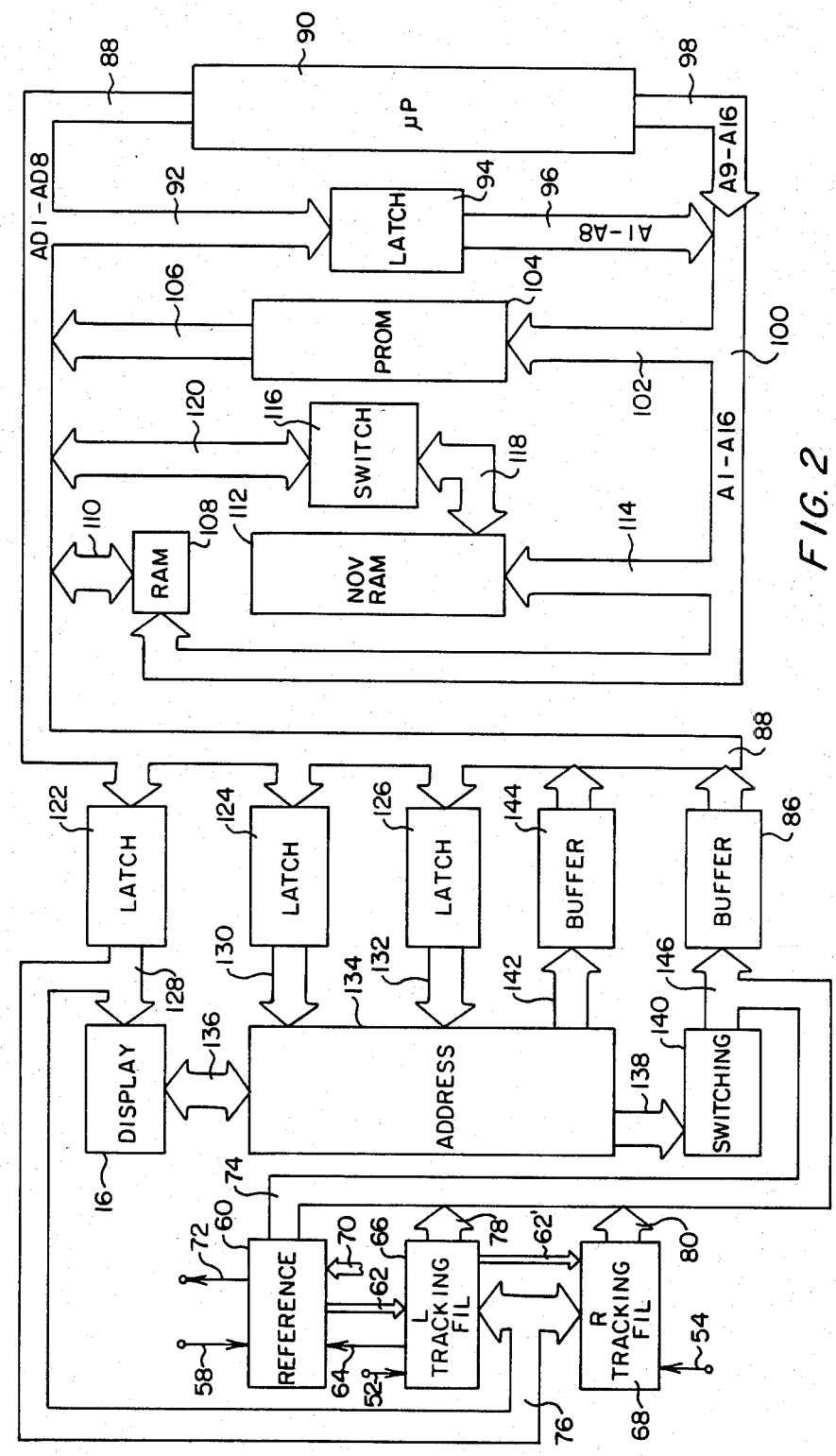
FIG. 2 is a block diagrammatic representation of the circuitry of the apparatus of the invention.

Referring to FIG. 2, a broad schematic block diagram of the circuit by which the instrument 10 operates is portrayed. In the figure, the rotational or tachometer information signal described in connection with FIG. 1 at line 58 is shown being directed to a reference circuit represented by block 60. Circuit 60 functions to treat the pulse categorized signal, condition it and utilize it to derive sinusoid signals (sine and cos) synchronous with the rate of rotation of rotor 44 for carrying out a filtering function. These two signals are provided as an output of the reference function at two-line bus 62. The reference circuit at block 60 also serves to derive frequency information in digital form for use in conjunction with conventional vibration analysis procedures carried out in conjunction with the utilization of the filtering functions of filter selection switch 34 at locations other than "track". The block also incorporates the frequency tuning potentiometer described in connection with tune control knob 36. Vibrational information in the form of treated signals for conventional vibrational analysis are provided from a line 64 emanating from the left channel tracking filter represented at block 66. The substantially identical and corresponding right channel tracking filter is represented at block 68. Operating in conjunction with switching control inputs from an address control bus 70, the reference circuit at block 60 additionally provides an output at line 72 for use in carrying out analysis utilizing a strobe light instrument and provides a digitized output signal at eight line bus 74.

Returning to the left channel tracking filter function represented at block 66, the circuit represented thereby provides a product detection form of synchronous filtering in response to vibrational inputs from earlier described line 52 as well as the sinusoid inputs from two-line bus 62. The tracking filter circuit operates in conjunction with control asserted from bus 76. The output of the filtering function 66 is directed to bus 74 as represented by bus 78. Bus 76 additionally is directed to the right channel tracking filter function represented at block 68. Filtering at function 68 is carried out by circuitry essentially identical to that represented at block 66 and is in response to vibrational inputs from along line 54 as well as the sinusoids described in conjunction with output 62 represented at 62'. The output of the right channel tracking filter circuit is directed to bus 74 as represented by bus 80.

The outputs of the reference function at block 60, as well as the tracking filter functions at blocks 66 and 68 as presented along bus 74 are directed through a buffer function represented at block 86, thence along data bus 88 to output ports of a microprocessor represented at block 90. Microprocessor 90 may be provided as a single chip 8-bit variety, for example, a type 8085A marketed by Intel Corporation. The data bus 88 coupled therewith contains eight lines and is additionally utilized in an address function thus is directed through connecting bus 92 to a latching function represented at block 94. The output of latch 94 is provided at bus 96 which is directed to a coupling with an eight line bus 98 extending from microprocessor 90 to form a 16-line address bus 100. Bus 100 is directed as represented by connecting bus 102 to a programmable read only memory function represented at block 104. The memory function may be provided, for example, as type 2716 and/or 2732A UV erasable PROMs marketed by Intel Corporation (supra). The output of memory function 104 is provided at connecting bus 106 which is coupled with the eight-line data bus 88.

Address bus 100 is shown to extend to random access memory as represented at block 108. These memory components may, for example, be provided as static RAMs of, for example, type 2114 marketed by Intel Corp. The RAM function of block 108 is accessed with data bus 88 through bi-directional connecting bus 110. To provide for permanent storage of balancing parameters and calibrating data, a non-volatile static random access memory (NOVRAM) 112 is provided as represented at block 112. This non-volatile memory function may be provided by a grouping of type X2201-30; 1,021×1-bit non-volatile RAMs as are marketed by Xicor Inc., Milpitas, Calif. Such NOVRAMs are generally organized as a conventional 1K static RAM overlayed bit-for-bit with a non-volatile 1K electrically erasable PROM. NOVRAM block 112 is coupled with address bus 100 through connecting bus 114. To avoid potential signal contention with respect to the functioning of NOVRAM 112 in conjunction with data bus 88, a solid-state switching function represented at block 116 is interposed therebetween. In this regard, note that the switching function 116 is coupled with NOVRAM function block 112 through connecting bus 118 and to data bus 88 through connecting bus 120. Control over this switching function 116 is provided from microprocessor 90. Switch function 116 may be provided, for example, as type 4016 solid-state switches marketed by National Semiconductor, Inc.

Data bus 88 is shown to extend, inter alia, to a grouping of three output ports or latches identified at blocks 122, 124, and 126. In turn, output port function 122 is coupled through connecting bus 128 to display function 16 in conjunction with a corresponding input from bus 76. Latching or output port functions 124 and 126 are shown connected, respectively, through connecting buses 130 and 132 to an address or decoding circuit or function represented by block 134. Serving to decode all address locations in response to microprocessor 90 control, the address function 134 is coupled through a bi-directional bus 136 with display function 16 and through bus 138 to the hand-manipulated switching circuit or function represented by block 140. The output of address function 134 is provided at 142 which is directed to an input port or buffer function represented by block 144. This function, in turn, is coupled with data bus 88. Similarly, the output of switching function 140 is provided along connecting bus 146 to the input of input port or buffer 86 along with bus 74.

With the arrangement thus generally depicted, the operation of instrument 10 may be set forth in more detail in conjunction with flow charts representing its memory retained control program. Because the instrument 10 provides prompting as well as informational readouts at display 16, such readouts are incorporated with the flow charts to follow enclosed within display blocks somewhat resembling the shape of display 16.

Figure 3:
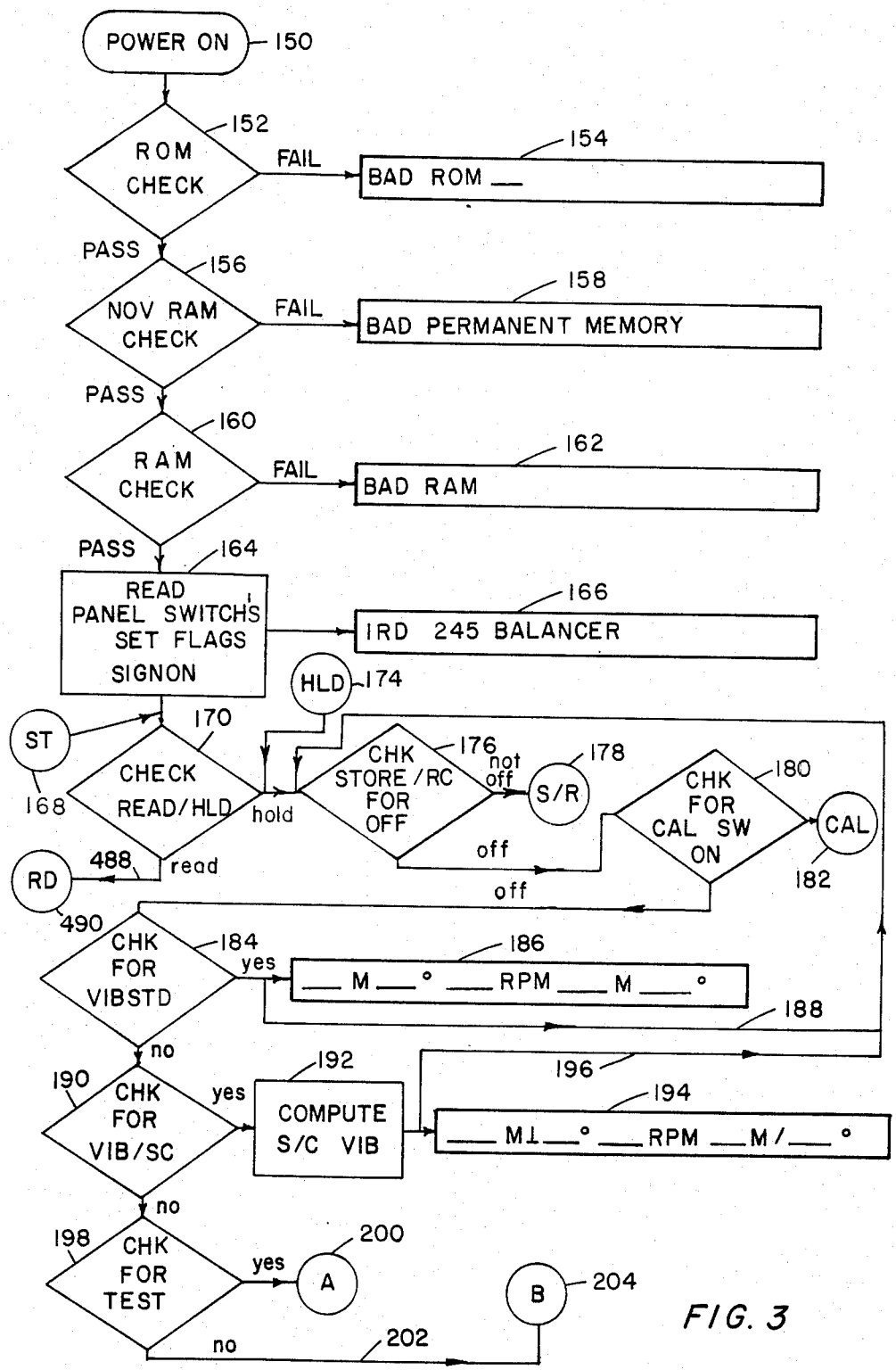
FIG. 3 is a program flow chart showing initialization and function switch analysis procedure.

Referring to FIG. 3, the initial sequence of operations carried out in conjunction with the subject program is revealed. Node 150 represents the condition wherein power has been applied through appropriate actuation of switch 20 on panel 14 by the operator. With the assertion of such power, the instrument 10 undergoes a conventional initialization procedure involving memory checks and switch position analysis. In this regard, as represented at block 152, memory function 104 is checked, for example, by a check sum test and in the event that test represents a defect, display 16 indicates the presence of a "BAD ROM" as represented at display block 154. The program then progresses, as represented at block 156 to check the NOVRAM function 112 for defects. In the event that this check shows a failure, then as represented at display block 158, a "BAD PERMANENT MEMORY" message is displayed. Where a pass condition is recognized following the check at block 156, then as represented at block 160, random access memory function 108 is checked, for example, utilizing a high-low verification technique. In the event of failure of such analysis, then as represented at display block 162, the message "BAD RAM" is provided at display 16. Where the RAM function 108 is determined to be operative, then as represented at block 164, the program proceeds to gather information as to the orientations of all switches; to set flags in correspondence therewith; and to provide a sign-on message as represented at display block 166. Any of a number of messages may be provided for sign-on purposes at the desire of the designor. The program then is at a logical "START" (ST) location as represented at 168, which location is representative of a point of return from various later stages of the program. At this juncture, the program inspects the operational orientation of Read/Hold switch 28 as represented at block 170. Recall that switch 28 is of a two-state variety and its condition at this point in the program determines whether the program will proceed in a read or a hold mode. In the event that the switch is in a hold orientation wherein led 32 is energized, then as represented at line 172, the program commences a hold sequence or hold mode form of operation. Inasmuch as later stages of the program return to this position, the return node (HLD) representative thereof is shown at 174. The initial determination in the hold sequence is represented at block 176 at which point the orientation of rotor memory switch 24 is checked to determine whether it is in an "OFF" position or any of the other four orientations providing for the recall of data or the storage of data. In the event that it is not in the "OFF" orientation, then the program enters a storage/recall subroutine (S/R) represented at node 178. Where switch 24 is in an off orientation, then as represented at block 180, the program determines whether or not an internal calibration procedure is under way in consequence of a calibration switch being in any of several predetermined positions. In the event that this is the case, then as represented at node 182 (CAL), a calibration subroutine is carried out. In the event that an internal calibration procedure is not under way, then the program progresses to investigate the orientation of function switch 22. As a first investigation, as represented at block 184, a query is made as to whether the switch 22 is in a standard "VIBRATION" orientation. Recalling that the hold sequence is under way, in the event that function switch 22 is in its conventional vibration orientation, then a readout of vibrational data then contained in random access memory function 108 is provided as represented at display block 186. Where appropriate, this is provided in terms of mils displacement and phase in degrees for left and right channels along with a readout of observed rpm of the rotor being investigated. The readout is continued until a a change has been made in the orientation of function switch 22 and this change will be observed by virtue of the program loop 188 extending to the commencement of the hold sequence at line 172. In the event that the query at block 184 is in the negative, then as represented at block 190, a determination is made as to whether switch 22 is oriented at the "STATIC COUPLE VIBRATION" location. In the event that this orientation is present, then as represented at block 192, a computation is made in accordance with the "STATIC COUPLE VIBRATION" orientation of switch 22. The readout corresponding therewith is in terms of mils, phase, and rpm is represented at display block 194. This readout continues until such time as an alteration of the orientation of switch 22 occurs as represented by loop line 196 which, in turn, is coupled with line 188.

In the event the inquiry at block 190 indicates that switch 22 is not in a "STATIC COUPLE VIBRATION" orientation, then as represented at block 198, an inquiry is made as to whether switch 22 is in a "TEST" position. If that orientation is present, then the program commences to carry out a test subroutine as represented at path A, node 200 identified as "A". In the event of a negative response to the inquiry at block 198, then as represented by line 202 and path B, node 204 identified as "B", the program commences to carry out a balance query routine.

Figure 4:
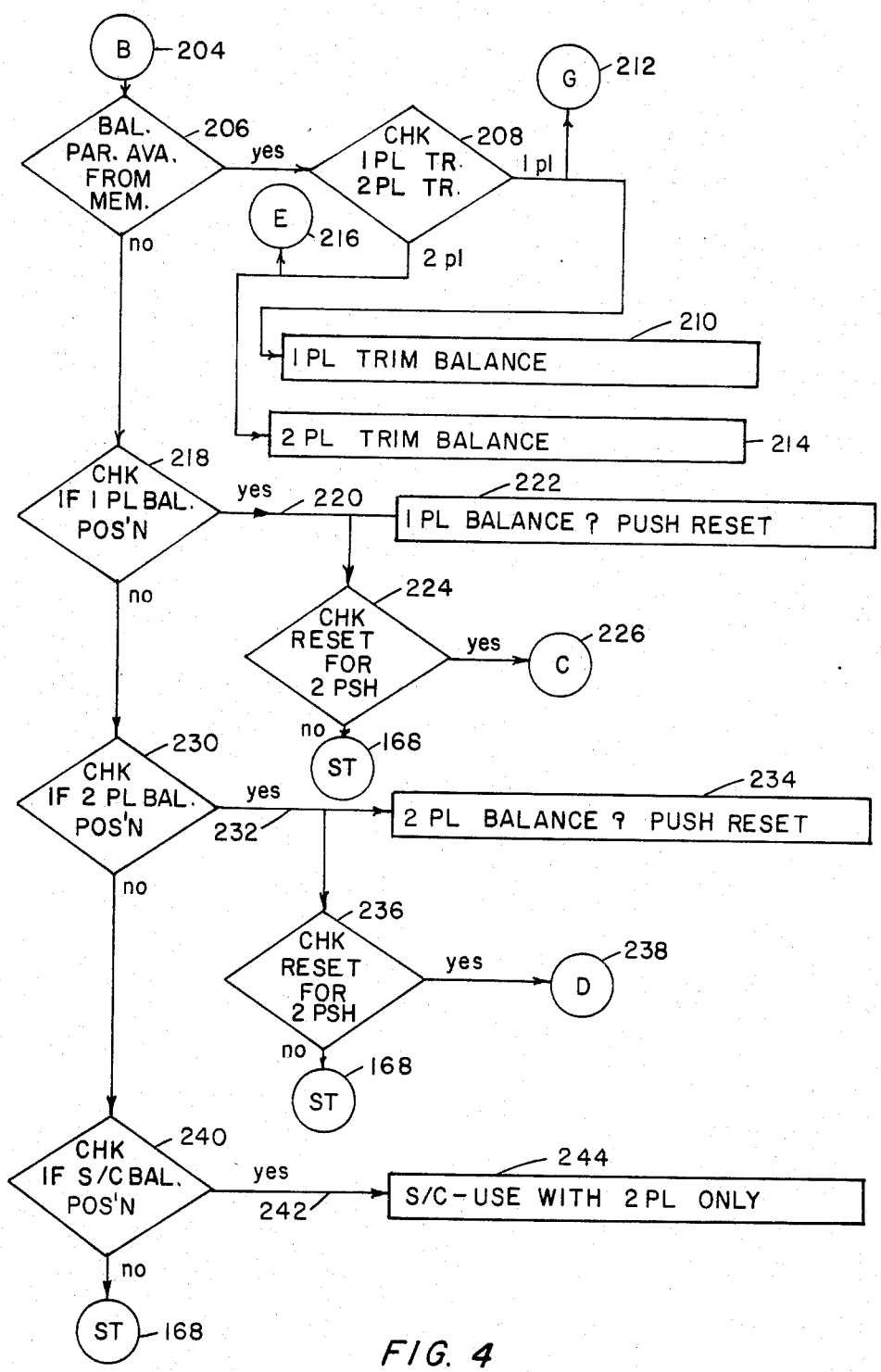
FIG. 4 is a flow chart showing program procedures for initial balancing functions.

Referring to FIG. 4, a balance query routine is revealed commencing with path B at node 204. The routine commences with an inquiry represented at block 206 as to whether any balance parameters have been inserted in RAM function 108. This will have occurred either by recall from NOVRAM function 112 or following the completion of preliminary and trial weight balancing runs. In the event that such parameters are in memory, then as represented at block 208 a determination is made whether the information in memory is concerned with one plane trim analysis or two plane trim analysis. In the event that 1 plane data is in memory, then display 16 provides a readout indicating "1 PL. TRIM BALANCE" as represented at display block 210. Additionally, the program enters a subroutine commencing with path G, as indicated at node 212 where the determination has been made that two plane trim balance parameters are in memory. The program then provides a readout indicating "TWO PL. TRIM BALANCE" at display 16 as represented by display block 214 and a subroutine is entered at a path identified as E as represented at node 216.

Returning to block 206, where balance parameters are not available from memory, ie. no trim balance sequence is at hand, then the program progresses to the inquiry represented at block 218 wherein a determination is made as to whether function switch 22 is oriented at the "1 PLANE BALANCE" position. If such orientation of switch 22 is present, then the program progresses as indicated by line 220 to provide a prompt form of readout inquiring as to whether 1 plane balance is desired and indicating that reset switch 26 should be actuated as shown in display box 222. The instructions for pushing the reset button occur twice a restart condition requiring the operator to reacknowledge that 1 plane balancing is desired. Such an arrangement assures that the reset switch 26 has not been inadvertently depressed contrary to the desires of the operator. In this regard, the program progresses to block 224 to determine whether the reset switch 26 has been actuated twice and in the event of an affirmative determination, the program commences a 1 plane balance routine the entry into which is represented by node 226 identified as "C". Should the reset switch 26 not be actuated twice, then the program returns to start position (ST) 168 as described in connection with FIG. 3.

Where the inquiry at block 218 results in a negative answer, then as represented at block 230 a query is made as to whether function switch 22 is in a 2 plane balance orientation. In the event of an affirmative response, as represented at line 232, the program provides a prompt readout at display 16 which inquires as to whether the operator wishes to carry out 2 plane balancing and, if so, the operator is instructed to push reset switch 26 as depicted at readout block 234. As before, the program is designed to require that the operator affirm a determination to carry out 2 plane balancing by pushing the reset button twice. Thus, as in the case of 1 plane balancing, the instructions represented at readout block 234 are repeated and the program performs in conjunction with the query at block 236 to determine whether switch 26 has been actuated twice. In the event of an affirmative response, the program proceeds to a 2 plane balance routine, the commencement of which is identified at "D" within node 238. Where two actuations of switch 26 are not achieved, then the program returns to the start location identified at (ST) 168 in FIG. 3.

Where a negative response is determined with respect to the inquiry at block 230, then, as represented at block 240, a determination is made as to whether function switch 22 is oriented at the "STATIC COUPLE" position, a position which utilizes data involved in 2 plane balancing only. It may be observed that this switch position has not been considered in connection with FIG. 3 in view of this condition for its utilization. Should switch 222 be in this orientation as indicated by line 242 and display block 244, the prompt or instruction is given that this form of static couple analysis can be used only with 2 plane balancing. Thus, the switch position is an unacceptable one to the instrument 10. Where function switch 22 is not in this orientation, then the program returns to start position 168 as described in connection with FIG. 3.

Figure 5A:
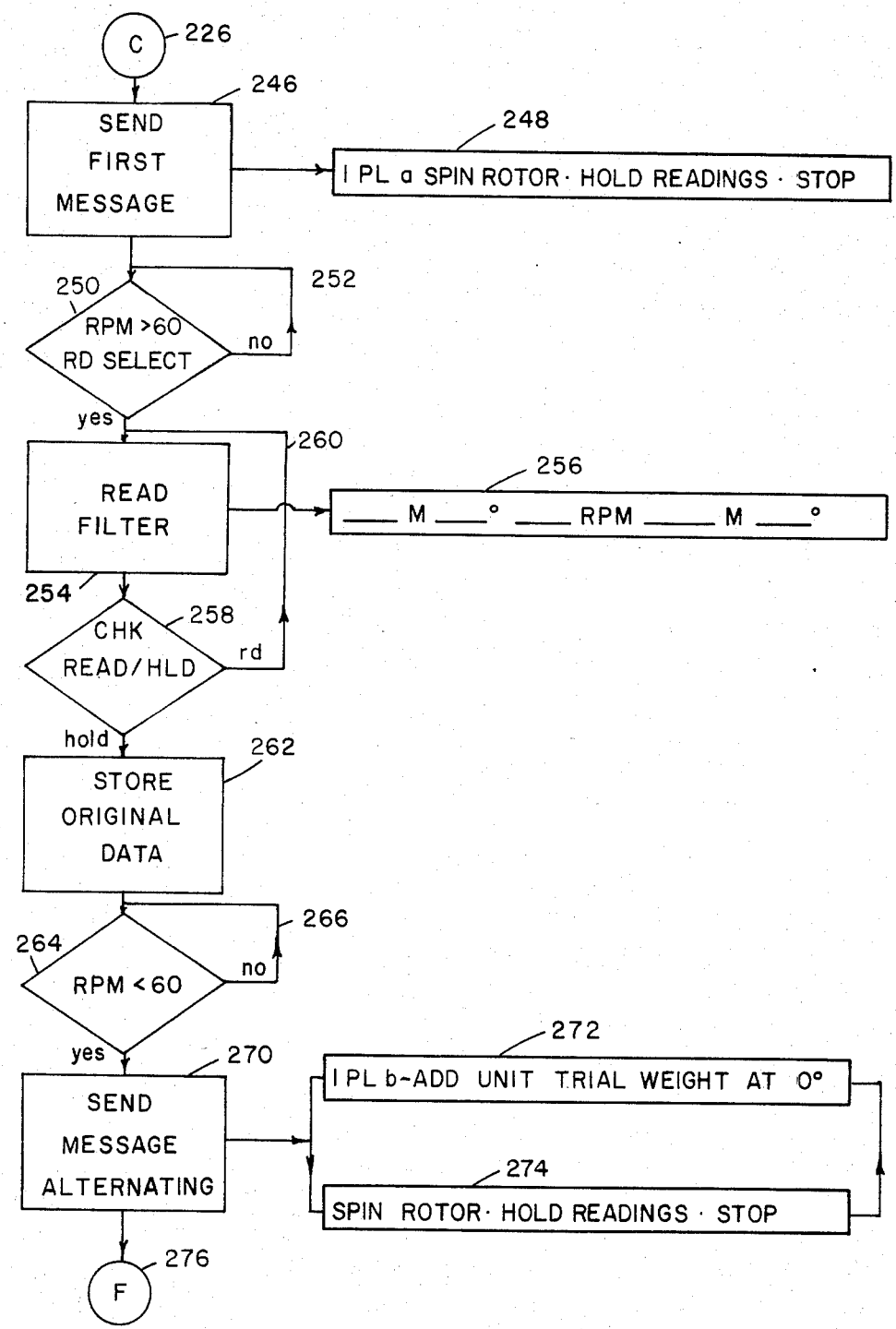
FIGS. 5A–5C provide a flow chart for carrying out 1-plane balance procedures utilizing the apparatus of the invention.

Referring to FIG. 5A, the commencement of the above-identified 1 plane balance routine at position C, node 226 is revealed. The initial step in this routine is represented at block 226 providing for the development of an initial prompt or instructional message which is shown in display block 248. The latter message provides that for 1 plane balancing, a first step (a) is to spin the rotor; following which the readings at display 16, upon stabilization, are submitted to random access memory by actuating switch 28. Following such actuation, the rotor is to be stopped. In accordance with these instructions, the program proceeds to determine whether the rate of rotation of the rotor is greater than 60 rpm as represented at block 250. In the event of a negative response, as represented by loop line 252, the program awaits the lower limit rate of rotation being achieved. Where the inquiry at block 250 is in the affirmative the program is flagged to enter a read mode of performance, then as represented at block 254 the output of the appropriate right or left channel filter function 66 or 68 is read out to display 16, that channel not being used usually being disconnected. Such readout is represented schematically at display block 256. In particular, displayed on a continuously updating basis is the rate of rotation (RPM) of the rotor being balanced, the displacement in the elected right or left channel and the phase thereof for such elected channel. Where English unit notation is selected, then displacement is shown in mils and where metric notation is elected it is shown in micrometers. When the updating of the readout as represented at block 256 becomes stable, then the operator, following the instructions presented as described at block 248, actuates READ/HOLD switch 28 as represented at block 258 to cause the program to enter a hold mode. In the event that switch 28 has not been actuated to cause entry into a hold mode of performance, then as represented by loop line 260, the program awaits such actuation.

Figure 5B:
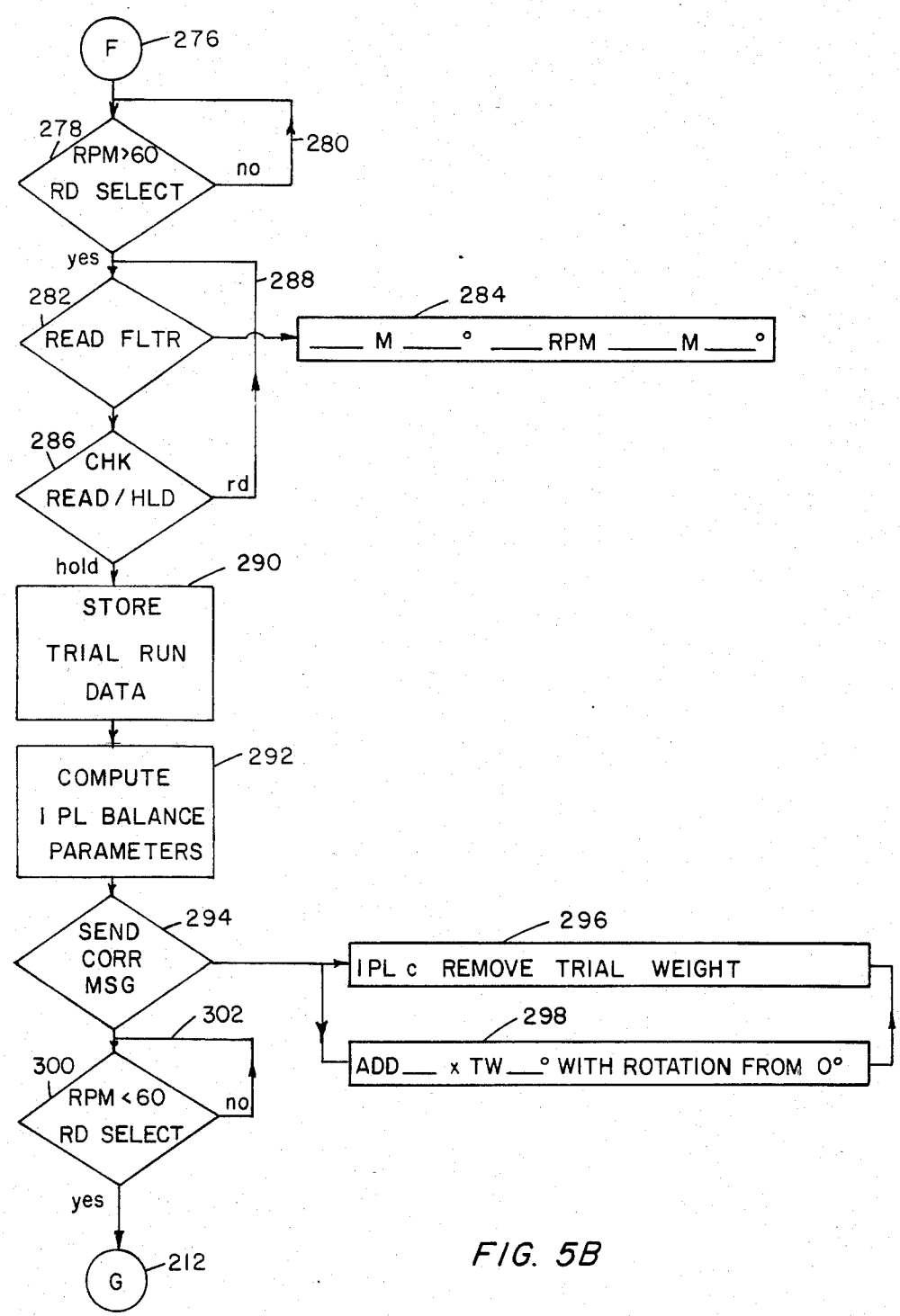

Following entry into a hold mode, as represented at block 262, the data corresponding with the original run are stored in random access memory function 108. Following such storage, as represented at block 264, a determination is made as to whether the operator has successfully carried out a stop procedure as set forth in the prompting message described in connection with display block 248. This is automatically determined by observing whether or not the speed of the rotor has fallen below 60 rpm. Where this is not the case, as represented at loop line 266, the program holds at this point until requisite slow down occurs. Where the rotational rate has fallen below 60 rpm, then as represented at block 270, a next prompt messsage is read out at display 16. For this tutorial, two sequentially occurring messages occur, the initial one being represented at display block 272 providing that for 1 plane balancing, as a step "b" the operator is told to add a unit trial weight at the zero degree position on the rotor. This phase position will correspond with the location of the element upon shaft 46 (FIG. 1) serving to actuate the photoresponsive pickup 56. Following the display of the message as shown at display block 272 for one or two seconds, the display cycles to the message readout shown at display block 274 providing instructions for the operator to spin the rotor to predetermined balancing speed; to hold the readings and to stop the rotor. The program continues as represented at node "F" as identified at 276 which is reproduced in FIG. 5B. Referring to the latter figure, the program is shown to continue to the query at block 278 wherein again a determination is made as to whether the rotational rate of the rotor is above 60 rpm and, if so, the read mode is entered into. As represented at loop line 280 the program remains at this position until such time as appropriate rpm valuations are achieved. Once such rates are achieved, as represented at block 282, the pertinent filter function is read and the data corresponding therewith is read out at display 16 as represented at display block 284. As before, the displacement in mils and phase along with rpm are displayed. The program then progresses to the instruction at block 286 wherein it looks for the actuation of switch 28 by the operator indicating that the readings observed at display 16 have become stable and the operator has elected to retain them. Where the read mode continues, as represented at loop line 288, the filter function continues to be read and the data corresponding therewith are read out at display 16. Where the switch 28 has been actuated by the operator to commence a hold mode of operation, as represented at block 290, the trial run data are stored in random access memory function 108. The program then carries out a computation of 1 plane balance parameters as represented at block 292 and progresses to provide a corresponding corrective readout to the operator at display 16 as represented at block 294. As above, the readout at display 16 is a two-part sequential message represented at display blocks 296 and 298. Note, that as a step c in the balancing procedure for 1 plane balancing, block 296 shows that the prompt to the operator provides for the removal of the trial weight followed by the corrective message set forth at block 298. The information at block 298 will advise the operator to add a corrective weight representing some number times the trial weight at a position given in degrees spaced arcuately from the zero position in the direction of rotation of the rotor. The program then awaits the stopping of the rotor as represented at block 300, again the arbitrary value of 60 rpm being selected as the rate determining whether this has occurred. In the event the rotor has not stopped, the program holds in a wait condition as represented loop line 302. In the event of rotor stoppage, then the program enters a read performance mode and continues as represented at "G" within node 212. Returning momentarily to FIG. 4, node 212 is shown to enter the balance query portion of the program wherein a determination is made as to whether balance parameters are available in RAM function 108 and whether a 1 plane or 2 plane condition exists. Thus, at this juncture, as represented at display block 210, the operator observes a readout at display 16 indicating that a 1 plane trim balance mode is at hand.

Figure 5C:
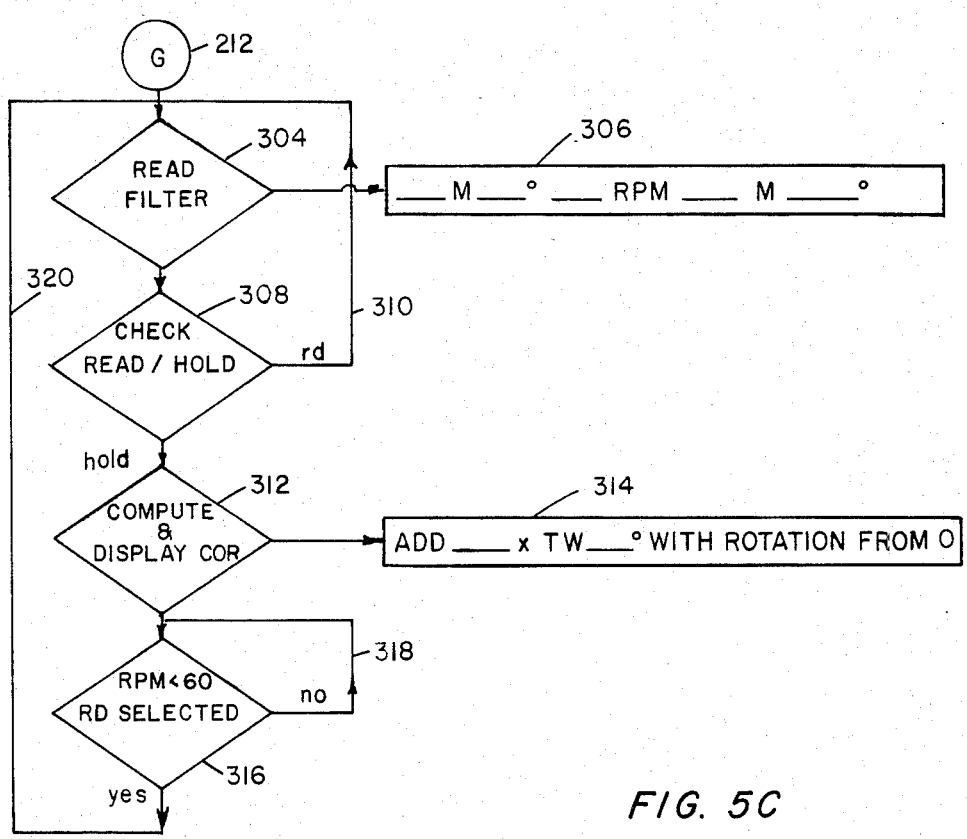

Looking to FIG. 5C, the trim balance routine for 1 plane balancing is represented as commencing at G with node 212. Because the balance parameters are now retained in RAM function 108, no trial weight runs are required to carry out further balancing. Thus, the operator again causes the rotor under balance to be rotated to balancing speed and, as represented at block 304, the appropriate filtering function is read and, as represented at display block 306, the displacement in mils and corresponding phase along with balancing rpm are read out at display 16. The filter continues to be read until such time as the operator determines that the readings are stable and appropriate. Then, as represented at block 308, the program awaits the actuation of switch 28 causing the program to enter a hold mode. Loop line 310 represents that the program will await the operator's actuation of switch 28. Upon actuation of the switch 28 and entry into a hold mode of operation, the program then computes new correction information as represented at block 312. This information is displayed in the same manner as described in conjunction with display block 298, ie., an instruction is made to add a certain percentage of the original trial weight at a particular phase position with respect to zero base point. The program then progresses to the instruction represented at block 316 wherein a determination is made as to whether the rate of rotation of the rotor under balance has fallen below 60 rpm. Where that is not the case, as represented by loop line 318, the program holds until such slow down occurs. When the rotor adequately slows down, the program re-enters a read mode and, as represented at loop line 320 returns to position G at node 212 in preparation for a next trim balance procedure. The number of trim balance runs which are undertaken by the operator is determined in accordance with any of a wide variety of considerations, each trim run generally providing some added improvement in balance.

Figure 6A:
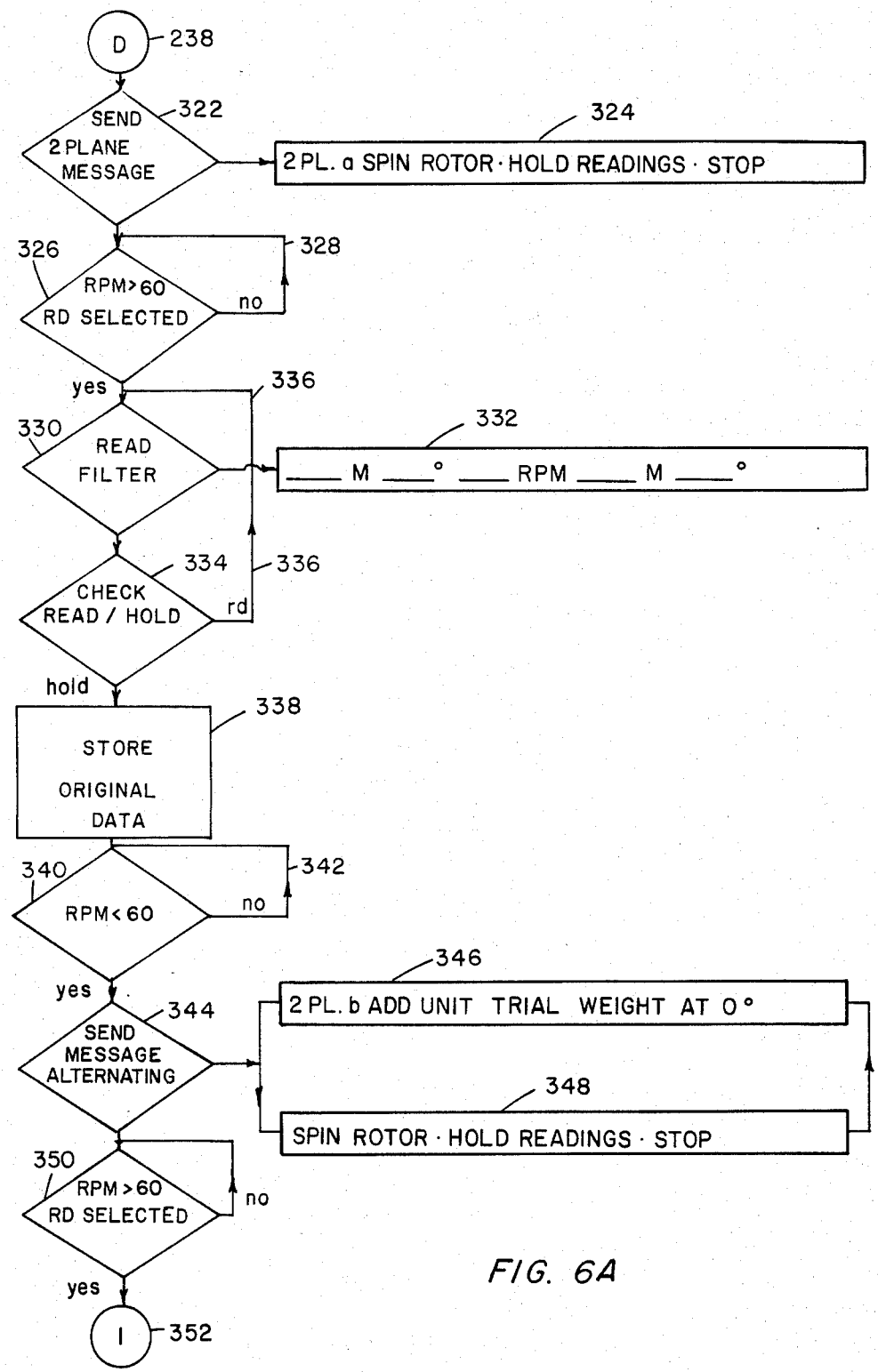
FIGS. 6A–6C represent a flow chart for carrying out 2-plane balance procedures utilizing the apparatus of the invention.

Returning to FIG. 4, it may be recalled that a determination is made within the program as represented at block 230 as to whether 2 plane balancing is to be undertaken. That being the case, as represented at display block 234, the operator is instructed to push the reset switch 26 twice whereupon as represented at "D" and node 238, the program enters a 2 plane balance routine. Referring to FIG. 6a, node 238 is reproducted representing the entry into the subject routine which commences as represented at block 322 with a presentation of a prompting message to the operator at display 16 and as represented at display block 324. Step "a" of the instruction provides for the initial spinning of the rotor under balance, followed by an instruction to hold the readings through actuation of switch 28, following which the rotor is to be stopped. The program then commences to monitor the rate of rotation of the rotor under balance as represented at block 326 and holds at this point in the program until the rate of rotation exceeds 60 rpm as represented by loop line 328. When the predetermined rate is exceeded, the program enters a read mode and progresses to read each of the tracking filter functions 66 and 68 as represented at block 330. The data from these filters are read out at display 16 on a continuous basis as represented at display block 332. Additionally, the program commences to look for a flag indicating the actuation of read/hold switch 28 as represented at block 334 and loop line 336. Where switch 28 has been actuated and the program has entered a hold mode, as indicated at block 338, the original run data is stored in RAM function 108. The program then commences to the instruction represented at block 340 wherein a determination is made as to whether the rate of rotation of the rotor under balance has fallen below 60 rpm. Where that is not the case, as represented at loop line 342, the program awaits the slowing down of the rotor. Where the rotation has commenced to stop and is below the predetermined rate, as represented at block 344, a next prompt message is provided to the operator at display 16. These instructions are provided at display 16 in a sequence of two readouts which continously cycle. As represented at display block 346, the initial message identifies the prompt as instruction "b" and provides for the addition of a unit trial weight at the zero degree reference position. The next instruction is represented at display block 348 and instructs the operator to cause the rotor under balance to be spinned to balancing speed; to actuate the read/hold switch 28 to hold the readings when stable and then to stop the rotation of the rotor. The program then progresses to the instruction at block 350 which monitors the rotational rate of the rotor being balanced and when that rate exceeds 60 rpm, then a read mode is entered and the program proceeds as represented at "I" at node 352.

Figure 6B:
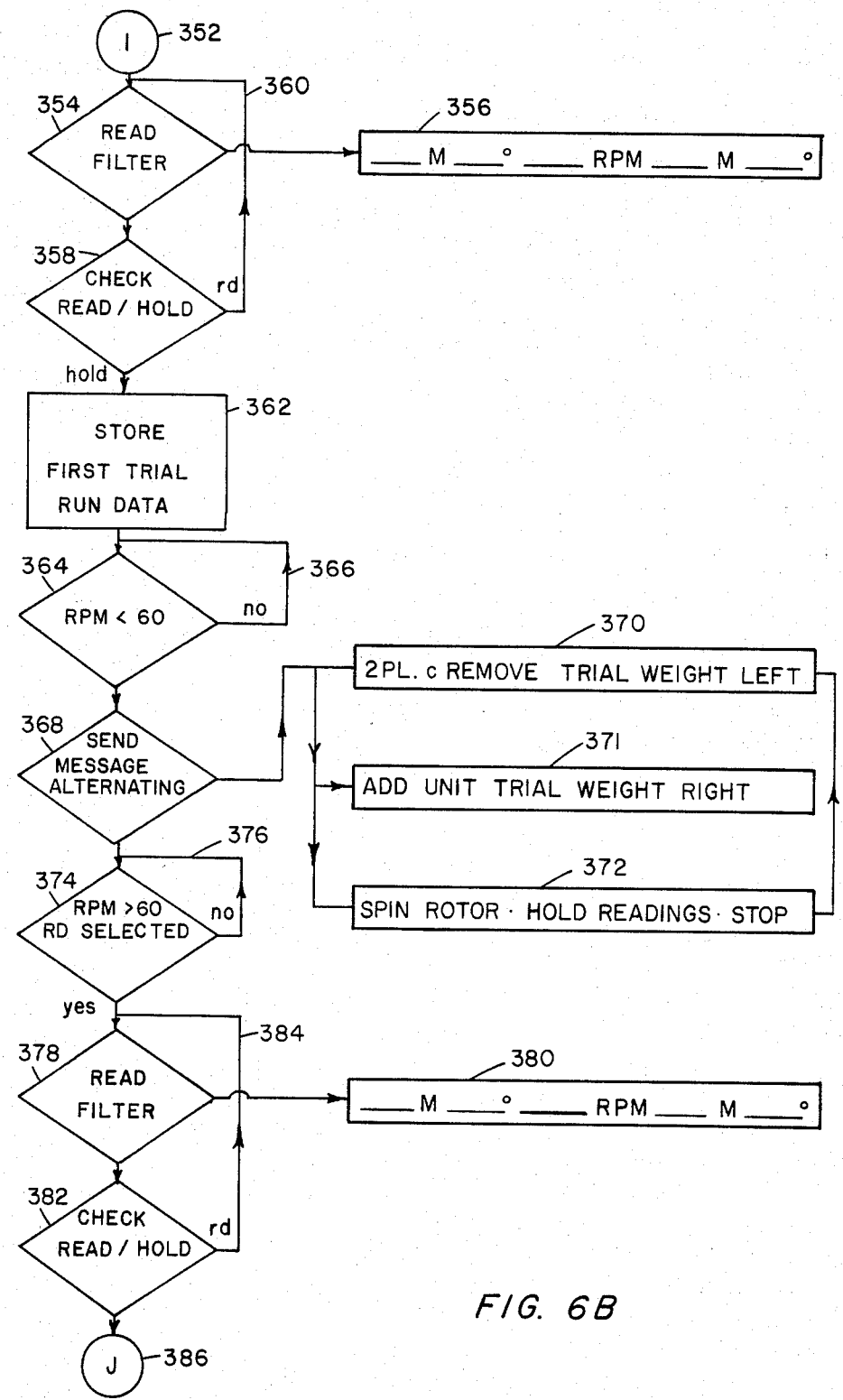

Referring to FIG. 6B, node 352 is reproduced and is shown leading to the next program step represented at block 354 wherein the filters 66 and 68 are read and their outputs are presented at display 16 as represented at display block 356. When these readings are stable, the operator again actuates read/hold switch 30 and the program awaits such actuation as represented at block 358 and loop line 360. Upon the entry into a hold mode of operation, as represented at block 362, the resultant trial run data is stored in RAM function 108. Following such storage, as represented at block 364 and loop line 366, the program awaits the stopping of the rotor under balance and when the rate of rotation thereof falls below 60 rpm, the program reenters a read mode and, as represented at block 368, a message step "c" is displayed at display 16 in a continuing sequence of three components represented at display blocks 370-372. Referring to the latter blocks, the operator is seen to be instructed to remove the trial weight position at the left plane following which the unit trial weight is added to the right balancing plane position. Upon adding the weight at the right position, the operator is then instructed to spin the rotor to balancing speed, to hold the readings and then to being the rotor to a stop. In keeping with these instructions, as represented at block 374 and loop line 376, the program then awaits the condition wherein the rotor has exceeded a rate of 60 rpm, whereupon a read mode of performance is entered. The program then proceeds, as represented at block 378, to carry out a reading of the filter and, as represented at display block 380, the displacement, rpm and phase positions of displacement are read out at display 16. When the readouts have stabilized, the operator actuates read/hold switch 28, the program awaiting such actuation as represented at block 382 and loop line 384. Upon the actuation of switch 28, the program re-enters a hold mode and progresses along path at "J" identified at node 386.

Figure 6C:
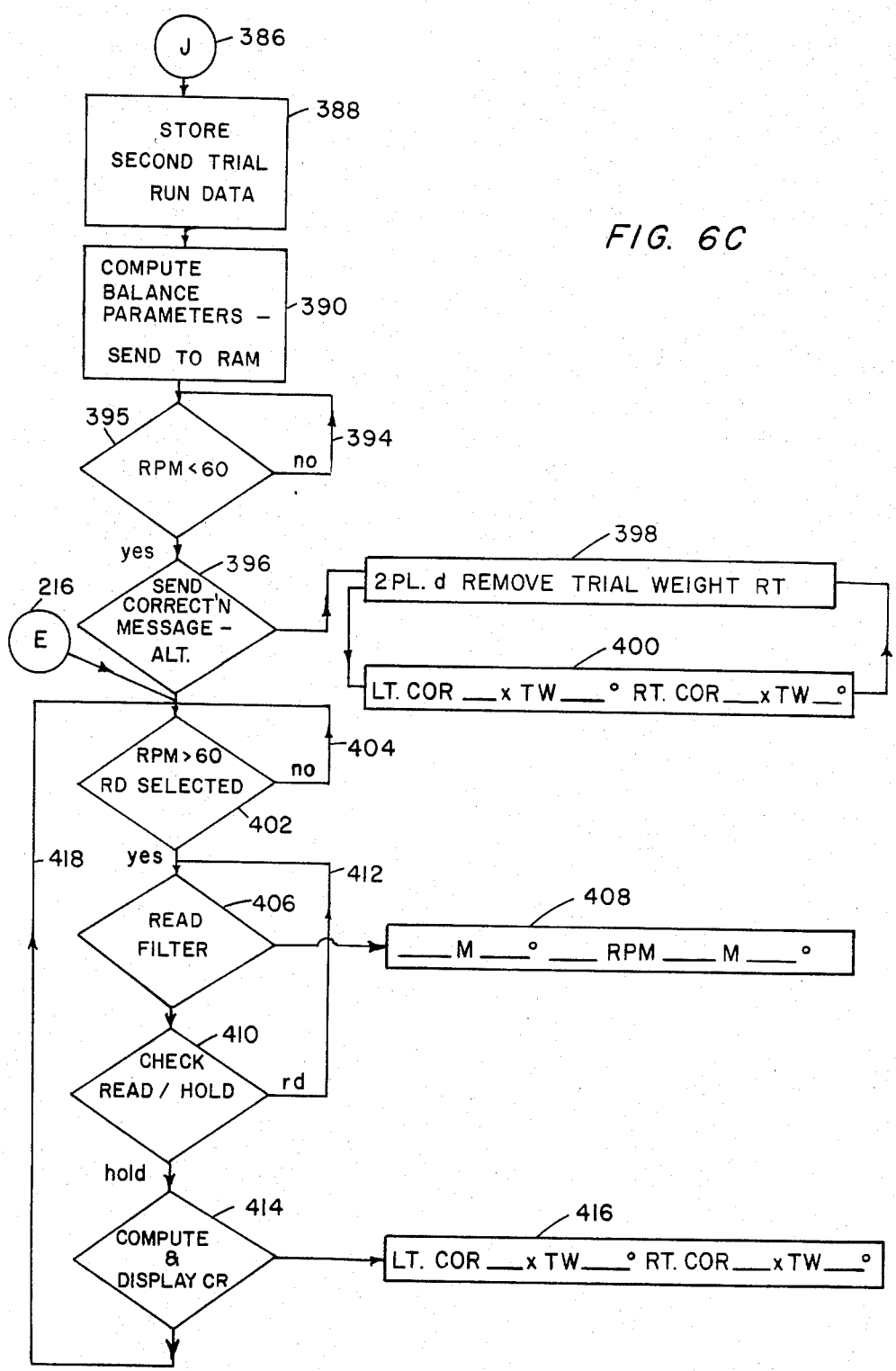

Referring to FIG. 6C, node 386 is reproduced and the program is shown to continue to the instruction at block 388 wherein the second trial run data are stored at RAM function 108. Following this storage, the program carries out the computation of balance parameters and submits these data to RAM function 108 as represented at block 390. Again the program awaits the stopping of the rotor under balance as represented by block 392 and loop line 394. When the rate of rotation has dropped below 60 rpm, then, as represented at block 396, a two part correction message is read out at display 16 as set forth in display blocks 398 and 400. As before, these readouts appear in succession on a continuously cycling basis. Note that the display at block 398 provides for step "d" wherein the operator is instructed to remove the trial weight from the right balancing position and, as represented at block 400, corrections with respect to the left correction plane as a multiplication factor of the trial weight and phase position thereof are provided along with the same information for applying balancing weights at the right correction plane.

Returning momentarily to FIG. 4, it may be observed, as represented at block 206, that where balancing parameters are available at RAM function 108, then the balance query routine determines whether such data are 1 or 2 plane and if the latter is the case, the display as represented at display block 214 is read out indicating that the program is in a condition for carrying out 2 plane trim balancing procedures and will continue in accordance with path "E" at node 216.

Returning to FIG. 6C, node 216 again is reproduced indicating the commencement of trim balance procedures. Where the operator elects to carry out a trim balance procedure, the rotor under balance again is caused to rotate to balancing speed and, as represented at block 402 and loop line 404, as soon as rotational speed exceeds 60 rpm, the program enters a read mode of performance. Where requisite rotor speed is achieved, as represented at block 406 and display block 408, the filters are read and the data corresponding therewith are displayed at display 16. This readout continues until the operator determines that the readings are stabilized, at which time the read/hold switch 28 is actuated. This interval is represented in the program by block 410 and loop line 412. Upon the actuation of switch 28, the program re-enters a hold mode and carries out a computation of trim corrections along with the display thereof as represented respectively at blocks 414 and 416. The readout at display block 416 is in the same format as provided at block 400. The operator then may stop rotor rotation and apply the improved balancing weights. In the interim, as represented by loop line 418, the program returns to position "E" at node 216 for any desired next succeeding sequence of trim balancing.

The program of instrument 10 continuously scans the positions of the switches at front panel 14 to detect if any alterations have been made in their orientations by the operator. Returning to FIG. 3, it may be observed that one check carried out by the program as described at block 176 is to determine whether the rotor memory switch 24 is in an orientation other than "OFF". If it is in such other orientation, then a storage recall subroutine is entered into as represented at node 178.

Figure 7B:
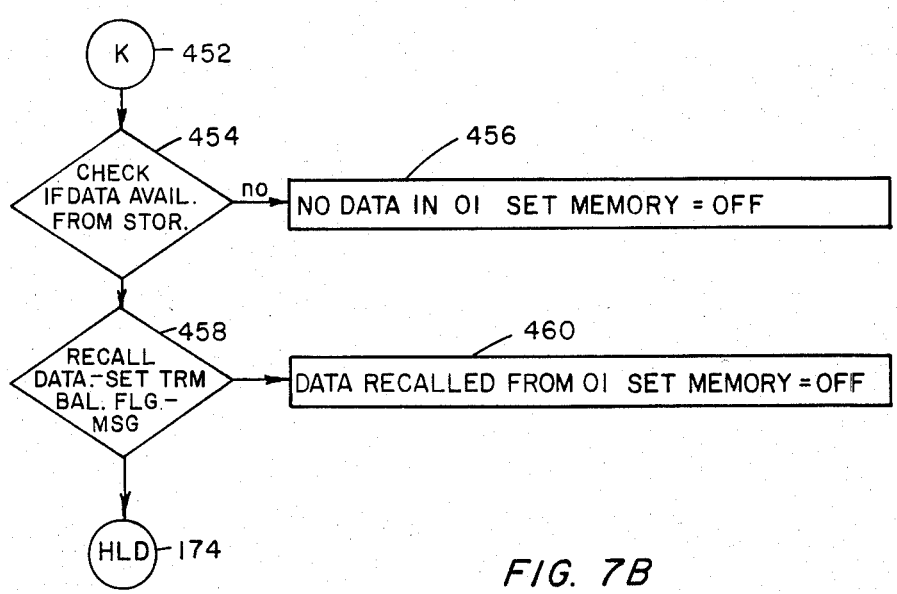
FIGS. 7A and 7B are a flow chart showing memory and storage recall procedures for the apparatus of the invention.
Figure 7A:
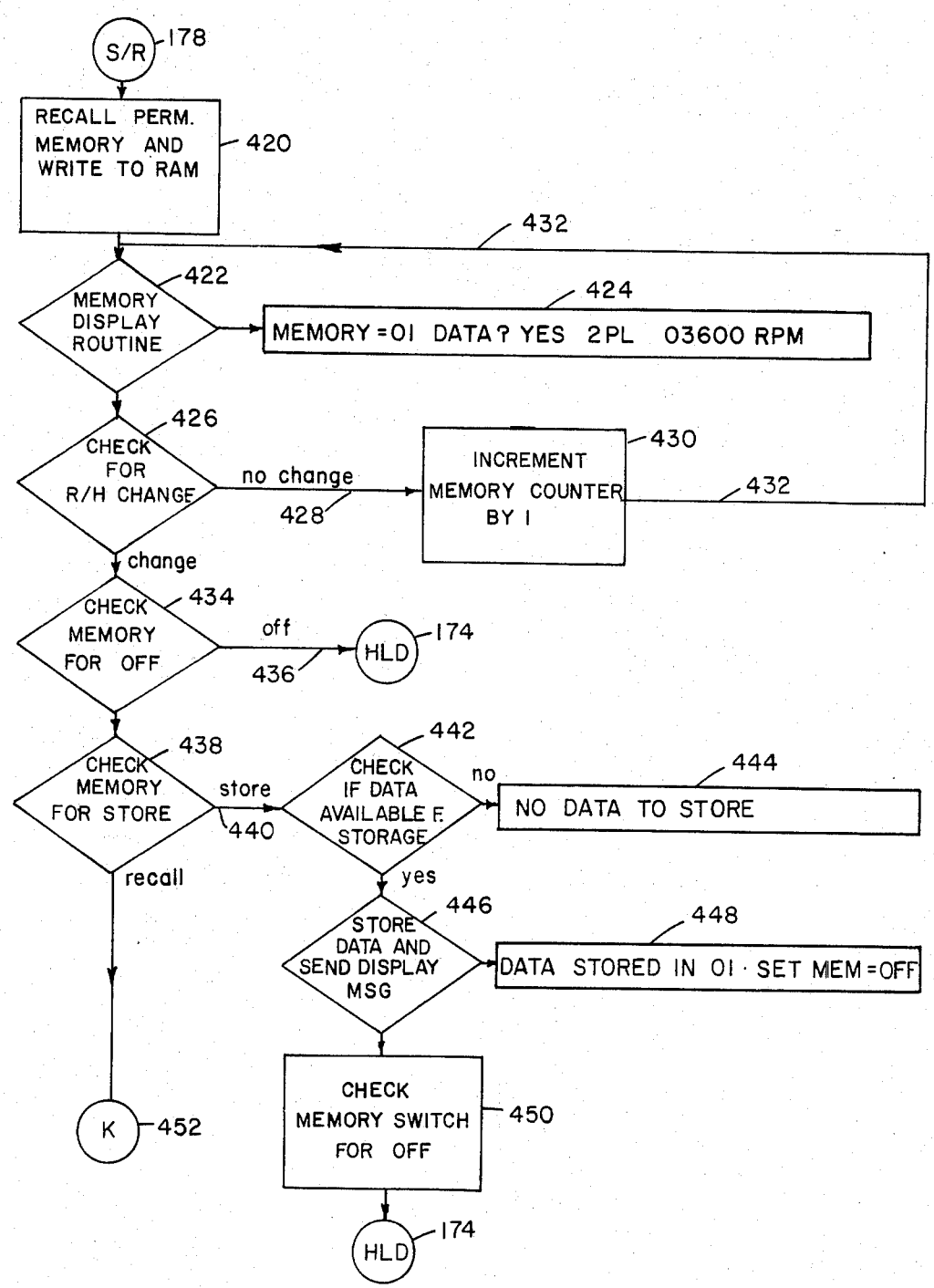

Referring to FIG. 7A, the storage recall subroutine is shown to commence with the aforesaid node 178. By recalling the balancing parameters contained in NOVRAM function 112, trim balancing may be carried out without initial and trial runs using trial weights. In this regard, the operator merely recalls the balancing parameters from permanent memory, readjusts function switch 22 to carry out 1 or 2 plane balancing as desired and causes the rotor to be balanced to be rotated at the balancing rpm. Upon actuating switch 28 to a hold orientation, only the trim balance routines need be carried out to provide a correctional readout at display 16 as described at display blocks 314 or 416. With the manipulation of rotor memory switch 24 to a "rotor number" location, as represented at block 420, information stored with any of the 34 numerically identified locations of NOVRAM 112 are submitted to RAM function 108 for access. The program of instrument 10 then commences to scan through this numerical sequence of memory 112 locations and display the status of each. The sequencing lasts for about 1 second for each memory location display. By actuating Reset switch 26, the operator may carry out a "backspacing" maneuver with respect to the memory scan sequence. The display routine for sequencing is represented at block 422 and a typical readout for memory is shown at display block 424. For example, memory location "01" is identified and balancing parameter data is indicated as being present at that location by the term: "YES". Additionally, an identification is made of the 1 to 2 plane balancing aspect of the balancing parameters as well as the rotational rate for balancing as shown to be 3600 rpm. Where no data is available, then the term "NO" supplants the information given as to parameters stored. The sequential display of memory data is carried out with a conventional looping program and this continues until read/hold switch 28 is actuated. The monitoring of the status of switch 28 within the program is represented at block 426, no change in the switch leading to line 428, which, in turn, leads to block 430 wherein instructions are provided to increment the memory counter by one digit. The remainder of the incrementing loop is represented at line 432. In the event that the read/hold switch 28 has been actuated, then as represented at block 434, rotor memory switch 24 is monitored for an actuation into an "OFF" orientation. Where such an orientation is observed, then as represented at line 436, the routine jumps to the hold node 174 (HLD) and re-enters the program at the corresponding (HLD) node described at line 172 in connection with FIG. 3. Where switch 24 is not in the "OFF" position, then the program proceeds to the instruction at block 438 wherein switch 24 is investigated for an actuation into an orientation designated "RECALL" or "STORE". Assuming that the switch has been manipulated by the operator to the "store" location, then as represented at line 440 and block 442, an investigation is made as to whether data are available at the location displayed for storage. In the event of a negative response to this query, as represented at display block 444, a readout is provided at display 16 indicating "no data to store". The instruction at block 442 assure that only balancing parameters can be submitted to NOVRAM function 112 for permanent storage. Thus, the operator will be blocked from attempting to store purely vibrational data or the like. Where an affirmative response is received from the query posed at block 442, then as represented at block 446 the balancing data available are stored in NOVRAM function 112 and a message indicating that the data have been stored is read out at display 16 as represented at display block 448. The program then proceeds to the instructions represented at block 450 wherein the rotor memory switch again is investigated for being positioned in an "OFF" orientation. Where that is the case, the routine returns to node position 174 (HLD) as described at FIG. 3 entering line 172.

Returning to block 438, where rotor memory switch 24 is in the "RECALL" location, the program continues as indicated at "K" and node 452. Referring to FIG. 7B, node 452 is reproduced as leading to instruction block 454. Block 454 represents that instruction in the program wherein a determination is made as to whether data are available at the memory location selected by the operator. If this is not the case, then as represented at display block 456, the operator will be apprised of the situation and instructed to set the rotor memory switch to the "OFF" position. In the event that data are available for recall, then as represented at block 458, the data are recalled, the trim balance flag is set and a message as exemplarily represented at display block 460 is provided. In the latter regard, the readout indicates that data indeed have been recalled from the elected memory location and instructions are given to set the rotor memory switch to its "OFF" location. The program then proceeds to the hold location as indicated by node 174 described in conjunction with line 172 at FIG. 3. By setting the trim flag as described at block 458, entry into a trim mode of performance as described in conjunction with FIG. 4 at block 208 becomes available and the program thus is made ready for trim balancing type performance. NOVRAM function 112 is non-volatile in character and will retain the data submitted thereto even though no electrical power is supplied to instrument 10. The memory further is characterized in being capable of receiving data at any given memory location in a write-over fashion such that the balancing parameters for any given memory location may be altered at the desire of the operator. One other aspect preferably is provided with the program in conjunction with the recall of data from NOVRAM function 112. In particular, it will be found desirable to carry out a conventional test such as a check sum test for each recall carried out by the operator.

The "TEST" position of function switch 22 affords the operator an opportunity for carrying out a test of the integrity of the majority of the switches at panel 14 when operating unit 10 in the field. As represented at block 198 leading to path "A" and node 200 in FIG. 3, where the test procedure is called for, the program of instrument 10 carries out the sequence of events represented in the flow chart at FIG. 8. In the latter figure, node 200 is reproduced and is shown leading to block 462 calling for the readout of an introductory message at display 16 as represented at display block 464. Note, that the latter block indicates that a front panel check routine has been called for and the operator is prompted push read-hold switch 28 to commence the first of eleven possible test sequences. Accordingly, as represented at block 466 and loop line 468, the program awaits the actuation of switch 28 by the operator. Upon such actuation, as represented at block 470, the first of the four orientations (AUTO) of left amplitude range switch 40 is evaluated. In this regard, the readout of display 16 as shown at display block 472 shows that as a first element of test 1, the left range switch is set to AUTO. The operator then has the option of manipulating switch 40 to each of its detent positions and display 16 will read out the orientation at which the instrument 10 is responsive. For "illegal" or improper orientations, the display 16 will indicate a "bad" location. The next succeeding test number is entered by again actuating read-hold switch 22. The actuation of this switch is monitored by the logic represented at block 474 and associated loop line 476. Following is a listing of each of the eleven tests which may be undertaken with the program:

| Test | Switch/Input | Switch Setting | Display Required | |
|---|---|---|---|---|
| 1 | Left Amplitude | Auto | Test 1. Left Range = Auto | 2? Push R/H |
|  | Range Selector | Lo | Test 1. Left Range = Lo | 2? Push R/H |
|  |  | Mid | Test 1. Left Range = Mid | 2? Push R/H |
|  |  | Hi | Test 1. Left Range = Hi | 2? Push R/H |
| 2 | Display | Left Analog | Test 2. Display = Left | 3? Push R/H |
|  | Selector | Digital | Test 2. Display = Digital | 3? Push R/H |
|  |  | Right Analog | Test 2. Display = Right | 3? Push R/H |
|  |  | Auto | Test 3. Right Range = Auto | 4? Push R/H |
| 3 | Right Amplitude | Lo | Test 3. Right Range = Lo | 4? Push R/H |
|  | Range Selector | Mid | Test 3. Right Range = Mid | 4? Push R/H |
|  |  | Hi | Test 3. Right Range = Hi | 4? Push R/H |
|  |  | Vel Out | Test 4. Filter = Vel Out | 5? Push R/H |
|  |  | Disp Out | Test 4. Filter = Disp Out | 5? Push R/H |
|  |  | Track | Test 4. Filter = Track | 5? Push R/H |
| 4 | Filter Selector | 60–1K | Test 4. Filter = 60–1K | 5? Push R/H |
|  |  | 600–10K | Test 4. Filter = 600–10K | 5? Push R/H |
|  |  | 6K–100K | Test 4. Filter = 6K–100K | 5? Push R/H |
|  |  | Recall | Test 5. Memory = Recall | 6? Push R/H |
|  |  | Rotor Number (left) | Test 5. Memory = Rotor | 6? Push R/H |

-continued

| Test | Switch/Input | Switch Setting | Display Required | |
|---|---|---|---|---|
| 5 | Rotor Memory Control | Off | Test 5. Memory = Off | 6? Push R/H |
| | | Rotor Number (right) | Test 5. Memory = Rotor | 6? Push R/H |
| | | Store | Test 5. Memory = Store | 6? Push R?H |
| | | Test | Test 6. Function = Test | 7? Push R/H |
| | | Static Couple Vibration | Test 6. Function = S/C Vib | 7? Push R/H |
| | | Vibration (standard) | Test 6. Function = Std Vib | 7? Push R/H |
| 6 | Function Selector | 1 Plane Balance | Test 6. Function = 1Pl Bal | 7? Push R/H |
| | | 2 Plane Balance | Test 6. Function = 2 Pl Bal | 7? Push R/H |
| | | Static Couple (bal) | Test 6. Function S/C Bal | 7? Push R/H |
| | | Eng (English) | Test 7. Mode = English | 8? Push R/H |
| 7 | Mode Selector | Met (Metric) | Test 7. Mode = Metric | 8? Push R/H |
| | | Hi (high) | Test 8. Damp = Hi | 9? Push R/H |
| 8 | Damping Selector | Lo (low) | Test 8. Damp = Lo | 9? Push R/H |
| | | 544, 546, 560 Vel Pu Cable | Test 9. Left Input = Vel | 10? Push R/H |
| 9 | Left Pickup Input Cable | N-CT Sig Sens/Monitor Cable | Test 9. Left Input = Disp | 10? Push R/H |
| | | 970 Accel Cable | Test 9. Left Input = Acc | 10? Push R/H |
| | | 544, 546, 560, Vel Pu Cable | Test 10. Right Input = Vel | 11? Push R/H |
| 10 | Right Pickup Input Cable | N-CT Sig Sens/Monitor Cable | Test 10. Right Input = Disp | 11? Push R/H |
| | | 970 Accel Cable | Test 10. Right Input = Acc | 11? Push R/H |
| 11 | Internal Setup | (Internal Settings) | Test 11. Internal = 00/000 End? | Push Reset |

Figure 8:
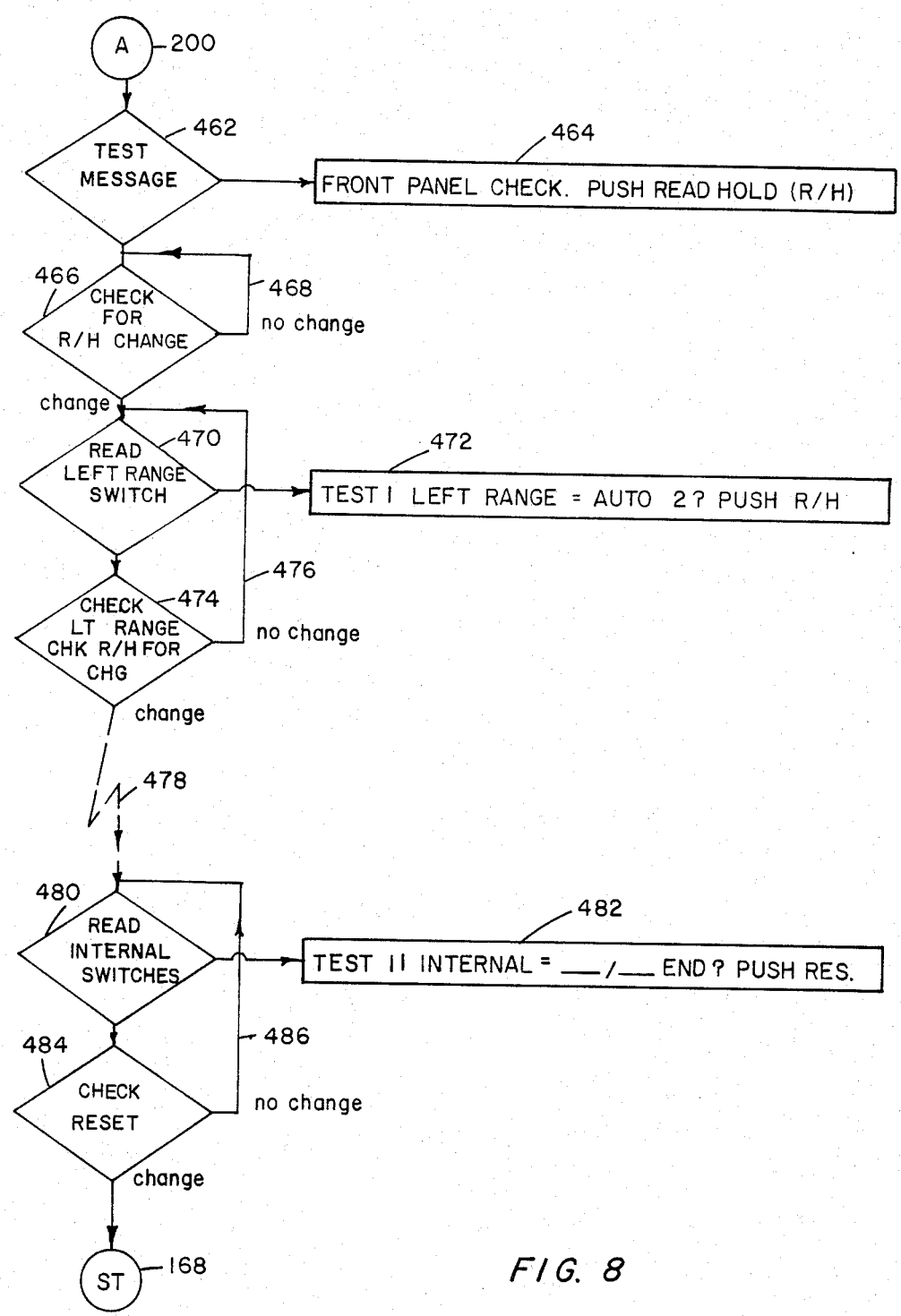
FIG. 8 is a flow chart showing the procedures for carrying out program testing of the front panel switches of the apparatus of the invention.

Test 11 of the sequence of tests is one which looks to the positions of the BCD switches used for carrying out calibration of instrument 10. This test is utilized for factory trained personnel in maintenance and calibration. The intermediate 9 tests are represented in FIG. 8 by dashed flow line 478 which is shown to lead to block 480 which represents an instruction to read the noted internal calibration switches. Block 180 is represented in conjunction with display block 482 which shows the readout for the final test and the instruction to actuate reset button 28 to end the test sequence. In the latter regard, the monitoring for the actuation of switch 22 is represented at block 484 and loop line 486. Following the actuation of switch 22 to end the test sequence, the program returns to start node 168 as described earlier in conjunction with FIG. 3.

Returning to FIG. 3, it may be recalled that following power on and initialization procedures, the program progressed to decision block 170 at which position a determination was made as to whether switch 28 had been actuated to assume a hold or read mode. In the discourse to the present, operation in conjunction with an initial hold mode as represented at line 172 has been considered. Now considering an initial actuation of switch 28 to a read orientation, the program proceeds as represented at line 488 and node 490 to carry out those filter subroutines elected by the operator. It may be recalled from the discussion in conjunction with FIG. 1, that filter switch 34 has three frequency range settings for manual tuning as well as a "track" setting for carrying out automatic tracking procedures. The remaining two switch orientations are "DISPLACEMENT OUT" or "VELOCITY OUT" which are real time readings of unfiltered overall amplitudes of vibration taken either as displacement or velocity. Looking to FIG. 9, as the filter subroutine is entered from node 490, the orientation of switch 34 is initially monitored as represented at block 492 to determine whether switch 34 is in an orientation representing a tracking operation or the manual range selecting orientation. If the latter is the case, then as represented at line 494 the program progresses along path "L" as represented at node 496. In the event that the switch 34 is in one of the remaining "filter out" orientations, then the program determines which of these orientations is present as represented at block 498 wherein the query is made as to whether the "DISPLACEMENT OUT" orientation is present. In the event of an affirmative response, as represented at line 500, the subroutine progresses to the instructions set out at block 502 wherein appropriate switching is effected to carry out an integration of the pickup signal to alter the conventionally provided velocity signal to a displacement signal. In the event of a negative response to the inquiry of block 498, as represented at line 504, the subroutine progresses to the instructions of block 506 wherein the analog filter out channels are read as digitized values. The program then progresses to the instructions at block 508 wherein the readout is adjusted for a range of maximum sensitivity without the encountering of overload conditions. The subroutine then progresses to block 510 where the vibrational data is formatted and displayed in a continuously updated fashion alternately as displacement information as represented at display block 512 or as velocity categorized information (inches per second) as represented by the display block 514. The readout as represented at display blocks 512 and 514 is terminated upon the operator actuating read-hold switch 28, the monitoring of this switch being represented in the subroutine at block 516 in combination with loop line 518. Where switch 28 has been actuated to assume a hold condition, then as represented at line 520 and (HLD) node 174, the program returns to flow path line 172 as described in conjunction with FIG. 3.

The control program of instrument 10 is uniquely arranged such that the product detection filters discussed in conjunction with blocks 66 and 68 may be utilized not only in carrying out balancing operations but also to provide filtered readouts suited for carrying out vibrational analysis in the field. For this purpose, filter switch 34 has the earlier orientations for manual tuning within given frequency ranges or automatic ranging at the "track" orientation. Where manual tuning is desired, the frequency tune control knob 36 is utilized.

Figure 9:
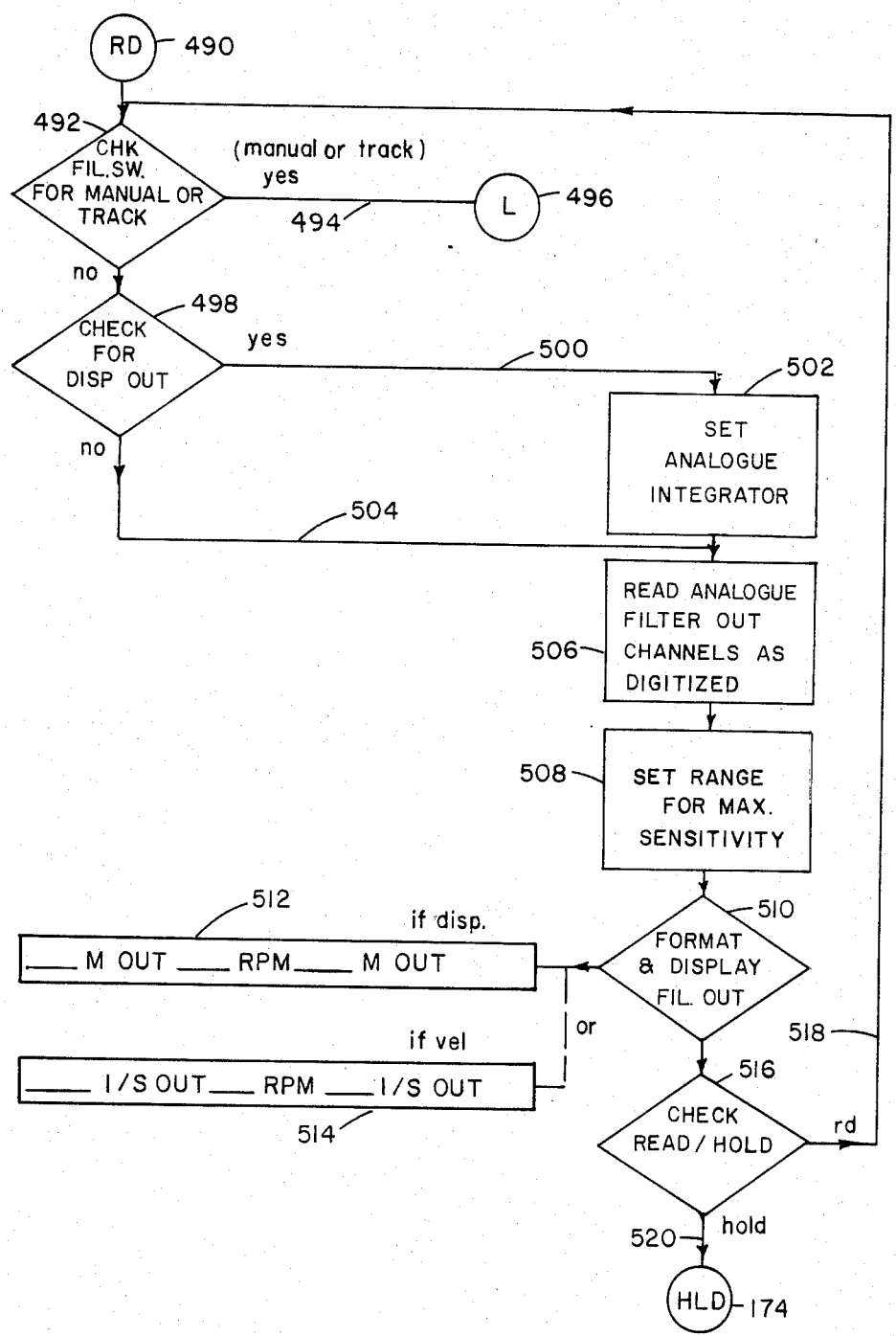
FIG. 9 is a flow chart of a subroutine carried out in conjunction with filtering procedures provided by the apparatus of the invention.

Entry into the subroutine for carrying out filter tracking has been described at line 494 and node 496 in FIG. 9. Referring to FIG. 10A, node 496 again is reproduced leading to instruction block 522 which provides for the reading of two analog quadratures of the left and right designated channel inputs. These signals are digitized. Following these procedures, as represented at block 524, the real and imaginary components of vibration of the filters are combined into vector components following which, as represented at block 526, filter ranges are established with respect to maximum sensitivity. Next, the subroutine progresses to the instructions of block 528 wherein the type of pickup is determined. Generally, this determination is made based upon input coding upon the cable extending from the pickup to instrument 10. Filter functions 66 and 68 contain integration networks utilized at the analog stage of signal treatment. However, to obtain displacement information where an accelerometer is utilized, then a software form of additional integration is required. Thus, where the presence of an accelerometer type pickup is determined at the instructions of block 528, then as represented by flow path line 530 and block 532 gain is adjusted and is represented at block 534, a division process is carried out to compute equivalent displacement. This division is based upon sensed rpm and the rpm information to the program is represented by line 536. The program then continues as represented by line 538 to block 540 at which position a determination is made as to whether the instrument 10 is adjusted for operation in an English or metric system. Where metric operation is elected, as represented at block 542, an appropriate multiplication converting English units to metric units is carried out. In particular, this instruction provides for multiplication by 254. Upon such conversion as represented at block 542, the program progresses as represented at path M and node 544.

Where no accelerometer is detected as represented at block 528, then the program progresses to the instructions of block 546 at which position a determination is made as to whether a displacement or "non contact" pickup is in utilization. Where such a pickup is being utilized, the filter function integration stage will have altered the signal and a recovery of displacement values is required. Accordingly, as represented at block 548 an appropriate gain adjustment is made and as represented at block 550 a software differentiation is carried out through the expedient of multiplying the signal values by rpm. The rpm input to the program is represented schematically by line 552. Following appropriate differentiation, the program commences as earlier described along flow path 538.

Figure 10A:
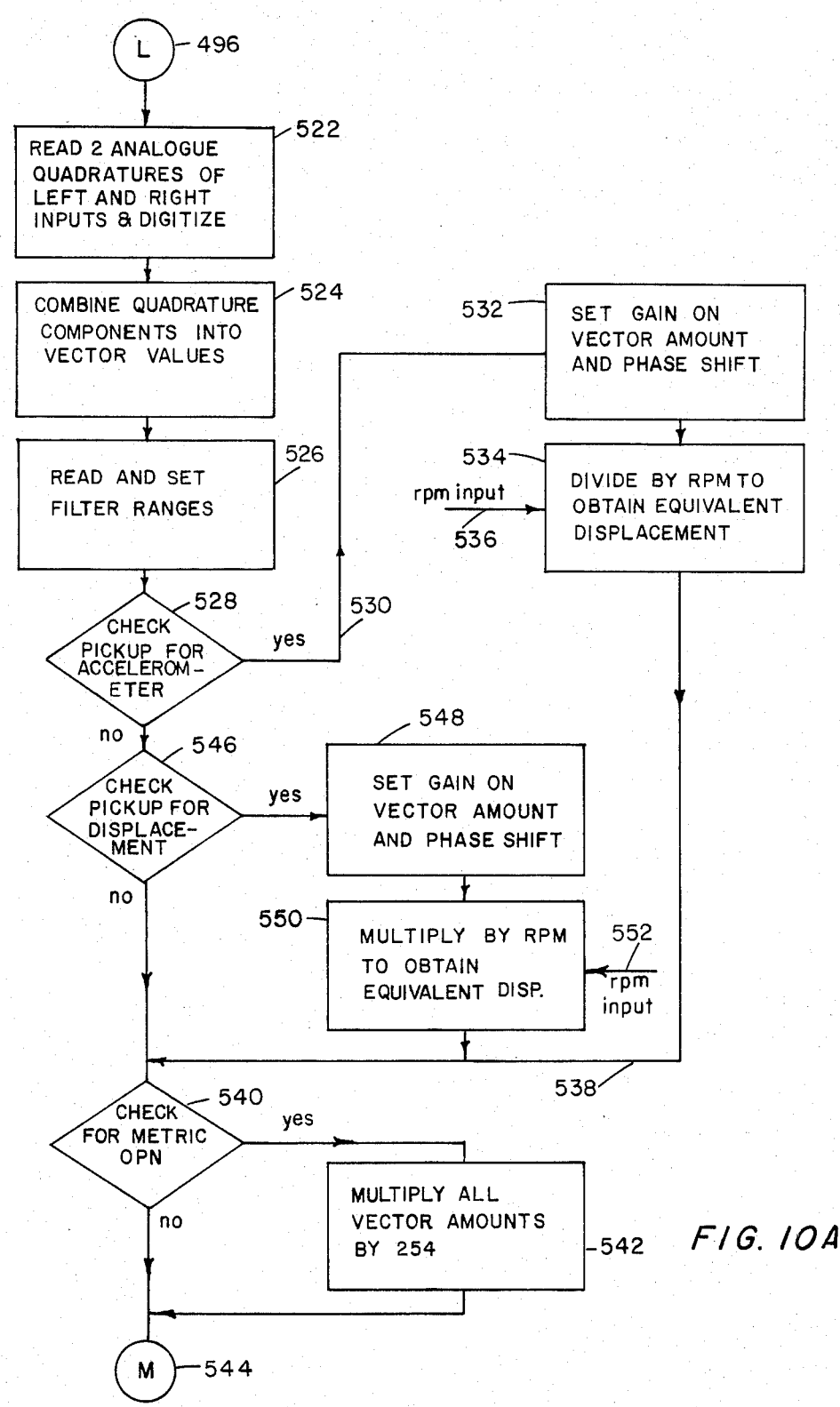
FIGS. 10A and 10B are a flow chart showing the procedures utilized in carrying out a tracking filter subroutine in conjunction with the operation of the apparatus of the invention.
Figure 10B:
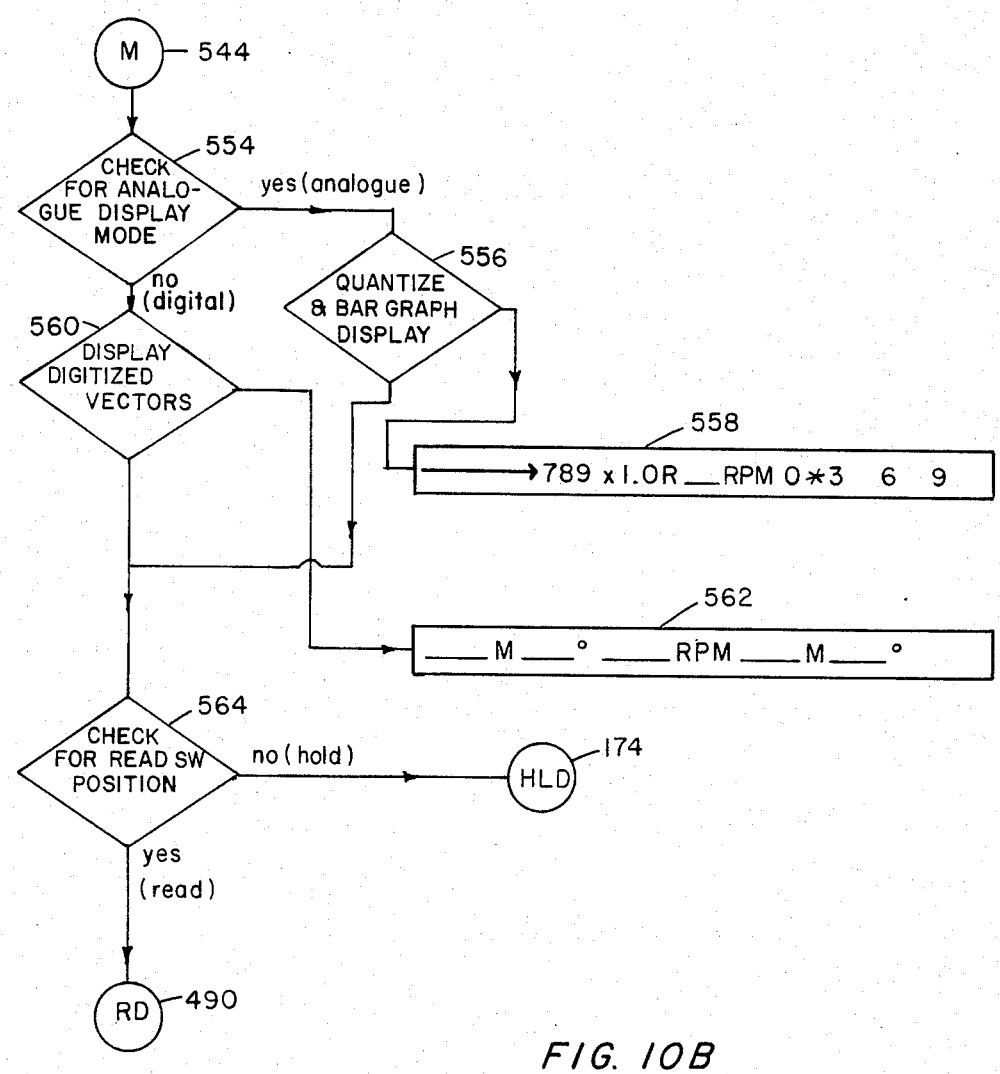

Referring to FIG. 10B, node 544 and path M again are reproduced and the program is shown leading to the instructions represented at block 554. Block 554 determines whether or not the operator has adjusted display switch 38 such that either a right or left channel analog mode of readout is desired or a digital readout is desired. Very often the operator desires to forego the high accuracy of digital readout in favor of a more rounded off display of values, the latter occurring predominantly where erratic readings are encountered. Instrument 10 provides a facility for either form of readout and for an analog readout a bar chart and clock hour readout is submitted to display 16. Block 554 queries as to whether switch 38 is in an analog display mode and in the event that determination is in the affirmative, the program functions to round off the digital valuations and to display the readout as a horizontal arrow extending along a sequence of numbers from 1 through 9 in association with display of a multiplication factor. An exemplary representation of the bar readout is provided at display block 558. Additionally shown in display block 558 is an rpm digital readout along with a clock face readout wherein the digits 0, 3, 6 and 9 are positioned in spaced relationship across the display. 0 is meant to indicate top dead center with respect to rotor reference position, while 3 is representative of 90° in the direction of rotation, 6 represents 180° and 9 represents 270°. Two spaces are presented between each of these increments each such space representing a 30° change in position. A small asterisk or star is superimposed at one of the increments to show the angle of the vibration vector. Showing of the latter angle in an analog fashion stems from the same rationale given in conjunction with vibration displacement readings inasmuch as, if the displacement amplitude in varying erratically, so also generally will be the angle corresponding therewith.

Where an analog form of readout is not elected and the operator has positioned switch 38 in a "DIGITAL" orientation, then as represented at block 560, a digital readout is provided as is represented at display block 562. As before, this readout is provided in mils (M) and degrees for left and right channels along with rate of rotation adjacent the label RPMm. For metric units, the mils readings are replaced by micrometer readings. The updated readout at display 16 continues in the instant routine until such time as read/hold switch 28 is actuated and the monitoring required for detecting such actuation is represented at block 564. Where the read position is retained, the program cycles to node 490 as described in FIG. 3 for a repetition of the filter reading sequence, whereas, in the presence of a hold mode orientation of switch 28, then the program returns to node 174 (HLD) leading to the hold mode operation represented at flow line 172 in FIG. 3.

Figure 11:
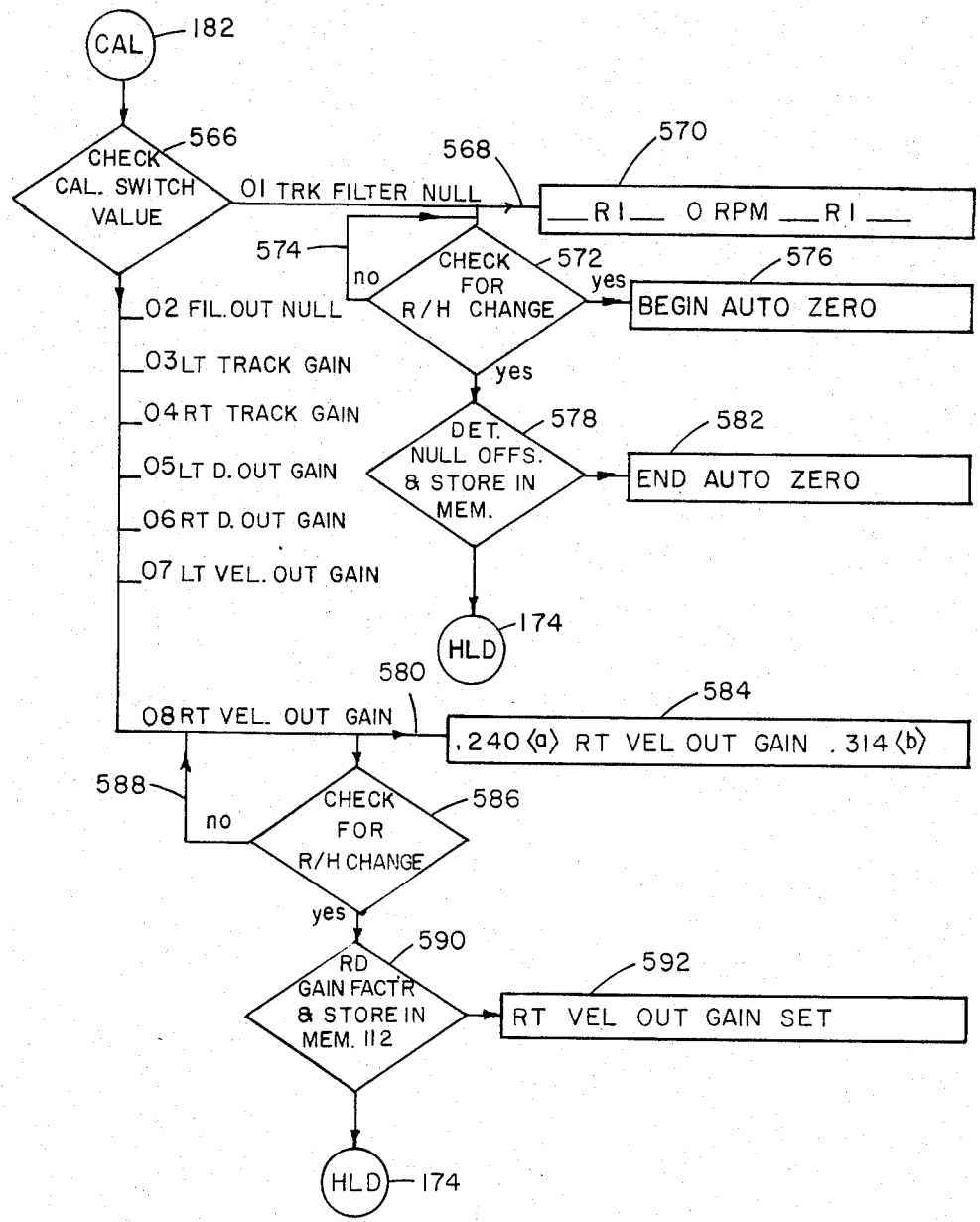
FIG. 11 is a flow chart showing the control procedures utilized in carrying calibration of the apparatus of the invention.

Looking again to FIG. 3, block 180 has been described as having instructions wherein the appropriate manipulation of a calibration switch by a factory technician will cause the instrument 10 to enter into a calibration mode as represented at node 182. Referring to FIG. 11, the subroutine for this calibration node is revealed. Typically, instruments such as instrument 10 will have gain components in its filtering system which are adjusted for offset as well as gain through the use of potentiometers and the like. These devices are both prone to alteration losing calibration and are the subject of cost in fabrication and in the carrying out of calibration procedures. The instant invention provides an ideally simplified calibration arrangement wherein the features of the permanent memory or NOVRAM function 112 are utilized for the second purpose of retaining calibration data, no potentiometers or the like being required in the circuit architecture. Once the offsets or gain adjusts are stored in memory function 112 in their digital form, they are recalled in accordance with the program to, in effect, shift the bias of incoming signals to a properly calibrated value. The subroutine commences as noted with node 182 which leads to block 566. Block 566 indicates that a calibration switch is monitored for the particular numerical value it is set at. In calibrating instrument 10, the technician manipulates a switch so as to be set on any of eight numerically designated positions. The calibration subroutine then carries out calibration for particular calibrating function. These functions, for example, may be as follows:

01 tracking filter null
02 filter out null
03 left track tracking filter gain
04 right tracking filter gain
05 left displacement out gain
06 right displacement out gain
07 left velocity out gain.

For switch positions 01 and 02, an automatic accommodation for offset displayed as "AUTO ZERO" is provided. The subroutine for this AUTO ZERO procedure is shown in FIG. 11 with respect to switch position 01. The drawing reveals that upon selection of switch position 01, as represented at flow path line 68, a display is provided as represented at display block 570 which shows the real and imaginary offset components (RI) for the right and left channels of the tracking filter. The program then awaits the technician's actuation of read/-hold switch 28 as represented by block 572 and loop line 574. When switch 28 has been actuated, display 16 provides a readout which indicates "BEGIN AUTO ZERO" as represented at display bock 576. The AUTO ZERO procedure is a sampling operation which is carried out over an interval of about 5 to 7 seconds wherein information as described in conjunction with block 522 in FIG. 10A is sampled and averaged. Based upon this sampling, as represented at block 578, appropriate digital null offsets are determined and the digital valuations thereof are stored in permanent memory or NOVRAM function 112. The input to the tracking filter is shorted to provide a 0 input in order to determine their offset adjustments. As such information is stored, display 16 provides a readout as shown at display block 580 indicating "END AUTO ZERO" and the program returns to hold flow path line 172 as represented by node 174. By adjusting the calibrating switch to, for example position 02, the same subroutine is carried out for the filter out system.

Gain adjustments corresponding with calibration switch positions 03–08 are represented in a typical subroutine commencing with line 582 representing a gain adjustment procedure for switch position 08. This switch position corresponds with right velocity out gain. Initially, the program provides a readout at display 16 exemplified at display block 584 wherein the value of the input signal is displayed in conjunction with the letter "a" and the output of the amplification function is read out in conjunction with the letter "b". To provide these data, the technician supplies a given input signal to the gain components of the filter and observes the output at the display. Adjustments to gain are made through the corresponding adjustment of one of three binary coded decimal switches within instrument 10, the technician observing the readout at display 16 in the course of switch adjustment. When appropriate gain is determined, the technician actuates read/-hold switch 28 and the monitoring of the switch for this purpose is represented at block 586 operating in conjunction with loop line 588. Upon the actuation of switch 28, the program stores the digital data inserted by switch manipulation in permanent or NOVRAM function 112 as described in conjunction block 590. Simultaneously, display 16 is provided a readout which indicates that the calibration procedure has been carried out, the display, for example, reading "RIGHT VELOCITY OUT GAIN SET" and the value of the inserted gain is displayed. Following the insertion of calibration data to memory, the program returns to hold mode as represented at node 174 and described in conjunction with FIG. 3.

Figure 12:
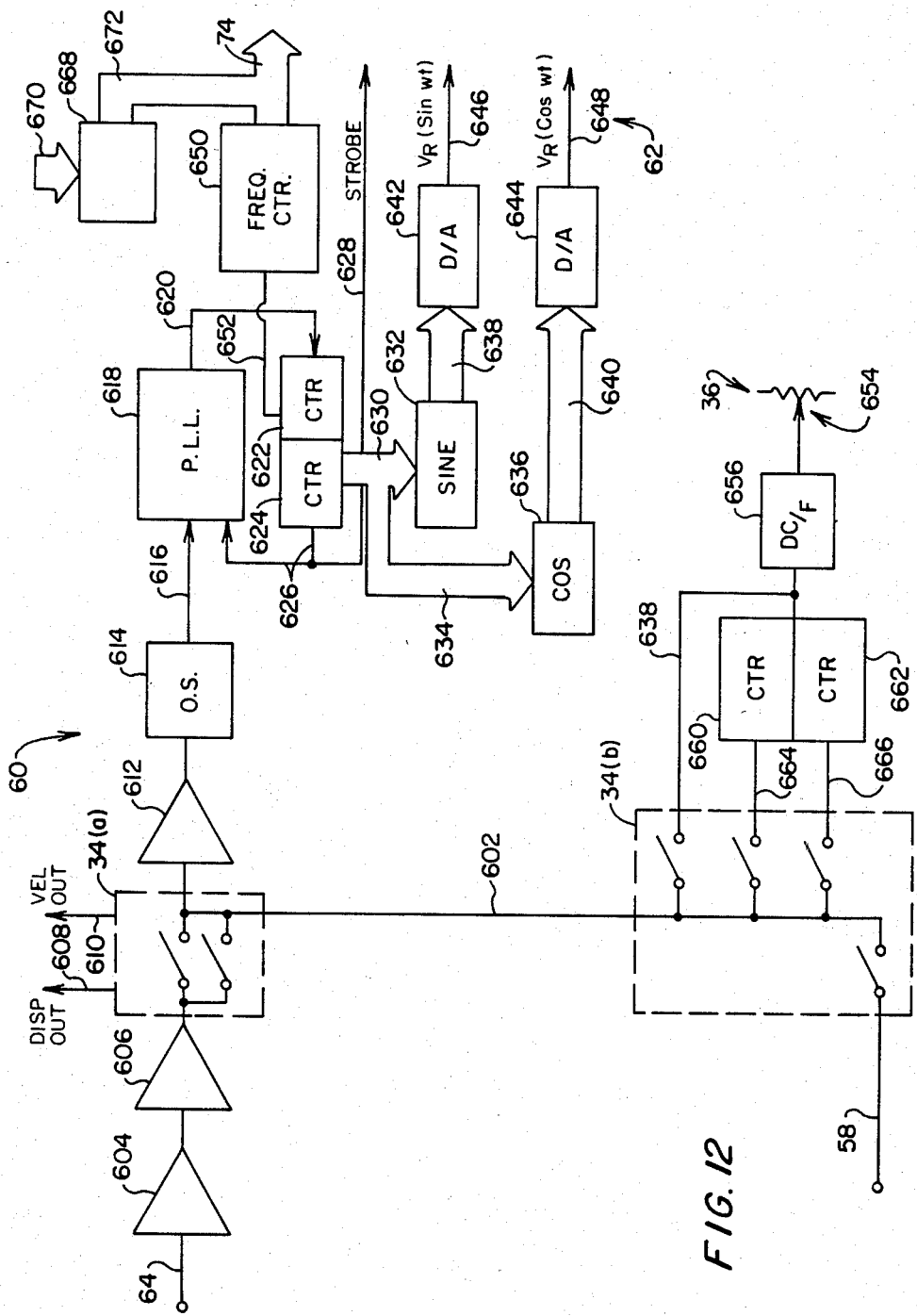
FIG. 12 is a block schematic diagram of the reference function of the apparatus of the invention.

As indicated earlier herein, balancing procedures are undertaken by instrument 10 in conjunction with a product detection technique utilizing a synchronous filter. Information utilized with this filter as well as inputs for vibrational analysis are developed at the reference function described earlier herein in connection with FIG. 2 at block 60. A more detailed illustration of the circuit components within function 60 are represented in FIG. 12. Referring to that figure, it may be observed that the reference input signal of photodetector 56 at line 58 is asserted through one component of the solid state switching features of switch 34 to an input line 602. Additionally, the reference function 60 is seen to receive an output of the left vibration pickup from along earlier described line 64 extending from the left channel tracking filter functions as shown at block 66. The signal provided at line 64 is unfiltered, ie. representing the signal derived from a velocity or displacement filter out orientation of filter switch 34. This signal is treated first at a limiter amplifier stage 604 and is refined by a Schmitt trigger stage 606. The pulse categorized signal then passes to two switch elements 34(a) of an analog switch operating as a portion of filter switch 34. This switch may be provided, for example, as a type AD7511 marketed by Analog Devices, Inc., Norwood, MA. Schematically represented in conjunction with this portion of switch 34 are lines 608 and 610 which, upon appropriate actuation of the switch 34 provide, respectively, the displacement out and velocity out signals ultimately utilized by the computational function of the circuit. Switch 34 alternately operates through component 34(b) thereof to submit the rotational data of line 58 along line 602 to switch component 34(a). ROMs 632 and 636, for example, may be provided as 16K PROMs marketed as type 2716 by Intel Corporation. From the latter switching component, the machine rotation related signal is directed to a signal conditioner stage 612 which may be provided, for example, as a type MC1453 marketed by Motorola, Inc. From conditioner stage 612, the signal is treated by a one-shot multivibrator stage 614 which, for example, may be a type 8601.

The output of the one-shot stage 614 is directed along line 616 to the signal input of a phase-locked loop stage 618. Stage 618 serves to multiply the input at line 616 by 256 and provides an output at line 620. The output at line 620 is directed to the input of two cascade coupled counters 622 and 624. These counters serve to provide an output at line 626 representing a division by 256 which is directed to the comparator input of stage 618 to provide for its operation. Counters 622 and 624 may, for example, be present as type 74L93 marketed by National Semiconductor, Inc. Line 626 additionally is coupled to output line 628 which provides a drive pulse output for utilization of a strobe light with unit 10. The 8-line output of combined counters 622 and 624 is coupled through 8-line bus 630 to the address inputs of read only memory 632. Bus 630 additionally is coupled through connecting bus 634 to the corresponding address inputs of another read only memory 636. Read only memory 632 carries a sine trigonometric lookup table and provides an output at 8-line bus 638. Correspondingly, read only memory 636 contains cosine trigonometric lookup data and provides an 8-bit output corresponding therewith at bus 640. Bus 638 is directed to the input of a digital-to-analog converter 642, while bus 640 is directed to the input of a digital-to-analog converter 644. Converters 642 and 644 may, for example, be provided as a type MC1408 8-bit multiplying digital-to-analog converter marketed by Motorola, Inc. Switch 34 and its related components, may be provided, for example, as a protected analog switch marketed as a type AD7511 by Analog Devices, Inc. (supra). With the arrangement thus shown, where the input to phase locked loop 618 derives ultimately from the monitoring of machine rotation line 58 the output of converter 642 at line 646 will be a digital recreated sinusoid which may be expressed as $V_R(\sin \omega t)$. Correspondingly, the output of converter 644 and line 648 will be the sinusoid $V_R(\cos \omega t)$ where $V_R$ is a reference voltage and $\omega$ is rotational rate. The sinusoidal signals at lines 646 and 648 correspond with the signals 2-line bus 62 described in connection with FIG. 2 and are directed to the tracking filter functions represented at blocks 66 and 68.

The frequency input to the reference function is also digitized by a frequency counter 650, the input to which at line 652 is coupled with one output of counter 622 so as to provide an input signal representing the input frequency at line 616 multiplied by 64. Counter 650 may be provided as an LSI device which combines components such as a high frequency oscillator, a decade timebase counter, an 8-decade data counter and latches along with decoder functions and digit multiplexers to provide an output at bus 74 which may be synchronous with monitored machine rotation. Such counters, for example, are marketed as type 7216 by Intersil, Inc., Cupertino, Calif.

Reference function 60 also provides for the alternate manual tuning arrangement carried out by the operator through the manipulating of filter switch 34 to the earlier-described three frequency ranges and concomitant actuation of the frequency tuning feature as at knob 36. The latter tuning component is shown in the drawing with the same numeration as a schematically portrayed potentiometer 654, the output of which is coupled with the input of a d.c.-to-frequency converter 656. Converter 656 may be provided, for example, as a type AD537 marketed by Analog Devices, Inc. (supra). The frequency categorized output of converter 656 is directed initially along line 658 to switching component 34(b) to provide a 6K–100K frequency range output. The same output frequency categorized signal is directed to a pair of counters 660 and 662 which carry out a dividing function such that the output of counter 660 at line 664 provides for frequency range output of 600–10K while the output of counter 662 at line 666 will provide a frequency range of 60–1K. Counters 660 and 662 may, for example, be provided as type 14018 counters marketed by National Semiconductor, Inc. In effect, by the manipulation of frequency tuning component 36 and utilization of converter 656, the operator is provided the unique opportunity of manually tuning a synchronous tracking filter through the expedient of injecting a synthetic reference signal. This arrangement significantly expands the versatility of the unit 10. For example, where considerable difficulties may be encountered in carrying out a balancing operation, very often it is desirable to turn to vibrational analysis to determine whether or not balancing can, indeed, be performed. Further, where a reference input cannot be picked up by such transducers as at 56, the operator may be called upon to utilize a strobe light to develop a reference. Note that the strobe is driven at line 628 from the most significant bit output of counter 622.

From the foregoing it may be observed that the output of the reference function 60 may be developed in consequence of an internally generated frequency or from the photoelectric pickup which monitors a rotor being balanced or analyzed or the output may reflect the filter out vibrational aspects of the machinery being monitored.

Also present within reference function 60 is a tri-state buffer 668 having an 8-line bus input 670 extending substantially from the switching functions for carrying out damping or election of English or metric units. Operating in pullup logic fashion, the tri-state buffer provides an output at 8-line bus 672 to bus 74 which serves to apprise the microprocessor function 90 of the condition of these switches. Buffer 668 may be provided, for example, as an octal tri-state buffer type 74LS244 marketed by National Semiconductor, Inc.

With the exception of output line 64, the circuits of left channel tracking filter 66 and right channel tracking filter 68 are substantially identical.

Figure 13:
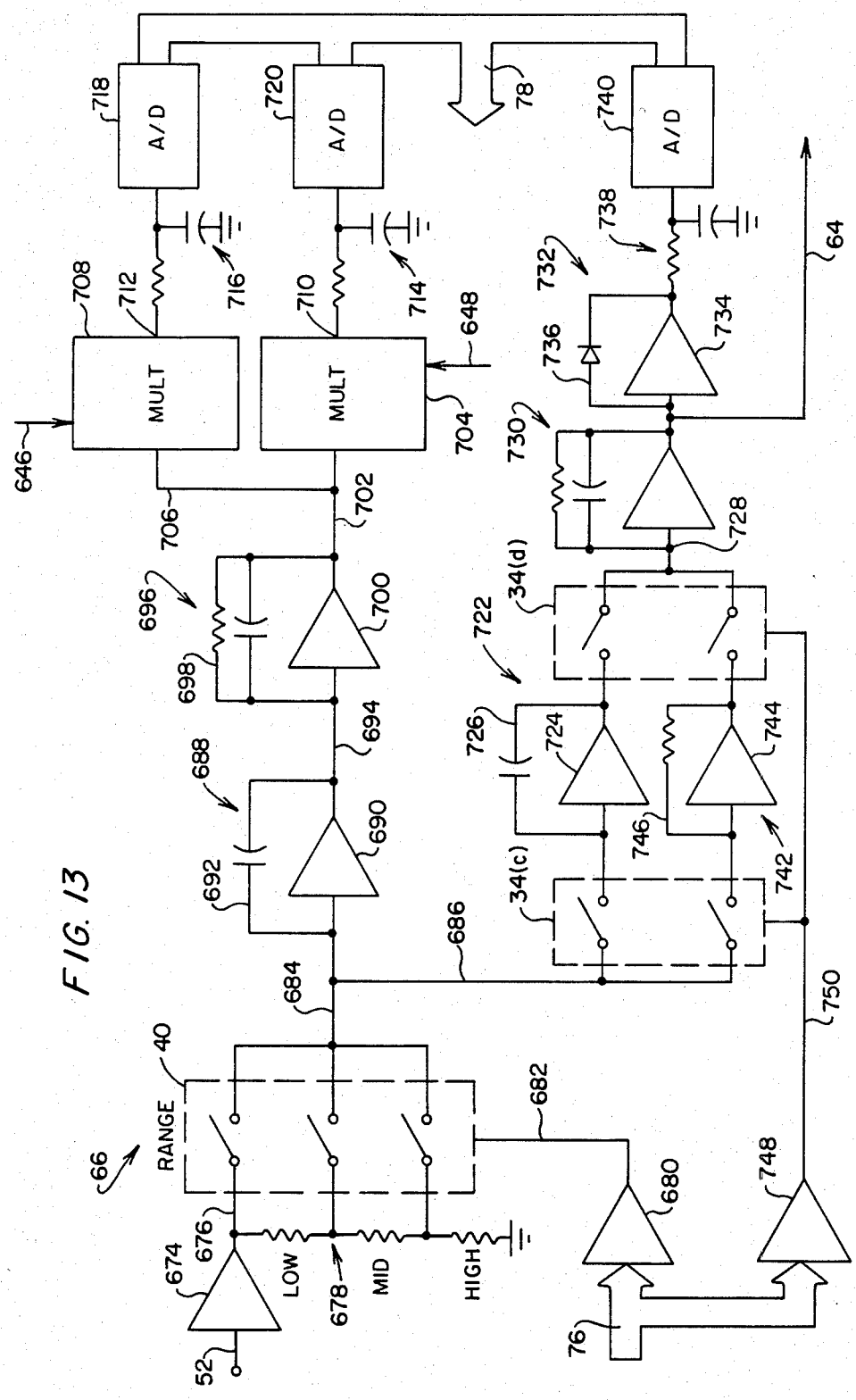
FIG. 13 is a schematic block diagram of the left filter function of the apparatus of the invention.

FIG. 13 shows the vibrational input at line 52 for the left channel being introduced to a buffer stage 674. Stage 674 may be provided, for example, as a type MC1458 marketed by Motorola Corp. The output of buffer 674 at line 676 is directed through a ranging network controlled by analog switch 40 and represented by divider resistor chain 678. Range switch 40 for the left channel, as earlier described, provides for select signal attenuation in a high, mid or low range and is controlled from microprocessor function 90 through bus 76 operating through a latch 680 and three line control bus 682. Latch 680 may, for example, be provided as a commercially available type 7475.

The output from the range switch stage 40 is provided at line 684 which leads either to product detection circuitry or to a "filter out" or non-filtering channel commencing with line 686. Looking to the former channel, the vibrational signal is directed through an integration stage 688 which may be provided as an operational amplifier 690 having a capacitive feedback path 692. Amplifier 690 may be provided, for example, as a type MC1458. The output of stage 688 is directed along line 694 to the input of a low pass filter stage 696 structured having a feedback path 698 coupled about an operational amplifier 700. Amplifier 700 may, for example, be provided as a type MC1458. The output of filter stage 696 at line 702 is directed to the input of a multiplier circuit 704 as well as through line 706 to the input of an identical multiplier circuit 708. Circuit 704 additionally receives the cosine categorized signal of line 648 from reference function 60, while circuit 708 receives the corresponding sine categorized signals from line 646. Circuits 704 and 708 may be provided, for example, as type AD534 multipliers marketed by Analog Devices, Inc. (supra). The product categorized outputs of circuits 704 and 708 are provided, respectively, at lines 710 and 712 and are directed through respective low pass filter stages 714 and 716. Thus representing the output of a product detection form of filter, the signal upon passing stage 714 may be represented as:

$$V_U(\cos \omega t + \theta_L)$$

While the signal upon passing stage 716 may be similarly categorized as:

$$V_U(\sin \omega t + \theta_L)$$

where $\theta_L$ represents the phase displacement of the left plane vibration signal from the signal at the output of filter stage 696. These signals then are digitized, the output of filter stage 716 being directed through analog-to-digital conveter 718, while the output of stage 714 is directed through a similar analog-to-digital converter 620. Converters 718 and 720 may, for example, be provided as type MC14433 marketed by Motorola, Inc. The output of converters 718 and 720 are coupled with bus 78 which, as represented in FIG. 2, is directed through bus 74 and connecting bus 146 in buffer stage 86 to microprocessor 90 through data bus 88. For a more detailed discussion of product detection filtering techniques as described herein, reference is made to the commonly-owned application for U.S. patent by the inventors herein entitled "Digital Electronic Balancing Apparatus", Ser. No. 189,904, filed Sept. 22, 1980, now U.S. Pat. No. 4,357,832, as well as U.S. Pat. No. 4,298,948 which are incorporated herein by reference.

Returning to the "filter out" channel of the left channel tracking filter function 66, line 686 is shown to be directed to two inputs of analog switch 34(c). Where the operator has elected to orient filter switch 34 to a "DISPLACEMENT OUT" position, then switch component 34(c) directs the vibration signal at line 686 through an integration stage 722 comprised of an operational amplifier 724 and associated capacitive feedback path 726. Amplifier 724 may be provided as a type MC1458 marketed by Motorola, Inc. The output of stage 722 is directed through another switching stage 34(d) to output line 728. Line 728 leads to the input of a low pass filter stage 730 which may be structured similarly to stage 696 and which serves as a phase shift compensating function for phase alterations introduced into the signal introduced from line 64 to reference function 60. The output of stage 730, in addition to being directed along the above-discussed line 64 also is introduced to the input of a rectifier stage 732. This stage is formed of an operational amplifier of the earlier discussed type MC1458 at 734 which operates in conjunction with a diode containing feedback path 736. Stage 732 serves to treat the raw, wide band vibration signal so as to convert it to an average d.c. value which is submitted to a low pass filter stage 738. The output of stage 738 is directed to an analog-to-digital converter 740 which may be identical to converters 718 and 720 and the digitized output thereof is directed to bus 78.

Where the operator has elected to orient filter switch 34 to a "velocity out" position, component 34(c) thereof directs the vibration categorized signal at line 686 to an amplification stage 742. Generally, instrument 10 is assumed to operate with a velocity form of vibration readout from its pickups 48 or 50. Stage 742 is conventional in structure including an operational amplifier 744 operating in conjunction with a feedback path 746 and having an output which is directed through switching components 34(d) to line 728 for introduction to earlier described filter stage 730. Control over switch compnents 34(c) and 34(d) is provided from the microprocessor 90 operating in conjunction with bus 76 and latch 748. Latch 748 may, for example, be provided as a commercially available type 7475. The output of latch 748 is directed along 2-line bus to the control inputs to switching stages 34(c) and 34(d).

Figure 14A:
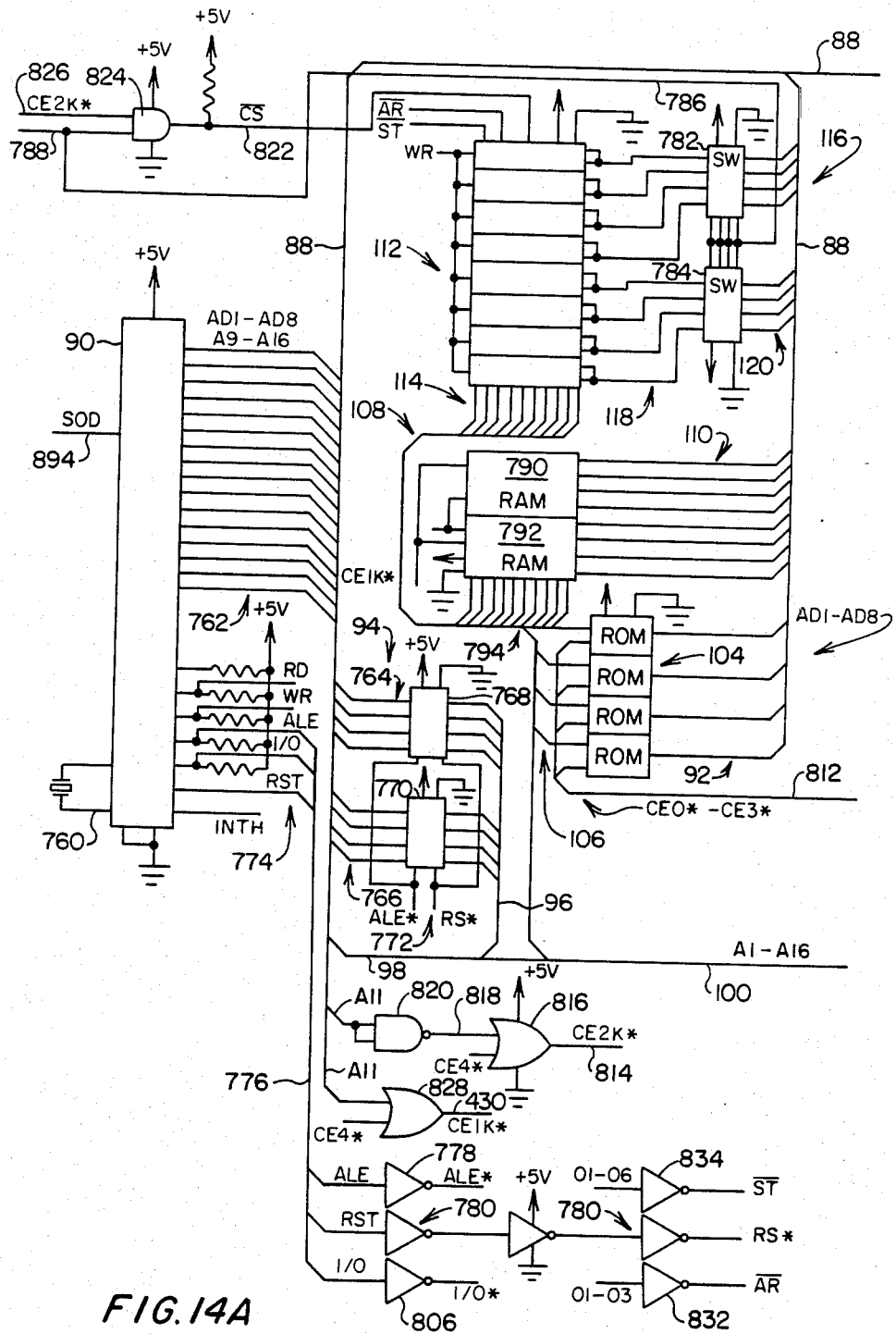
FIGS. 14A and 14B show a schematic circuit diagram of the microprocessor function of the apparatus of the invention.
Figure 14B:
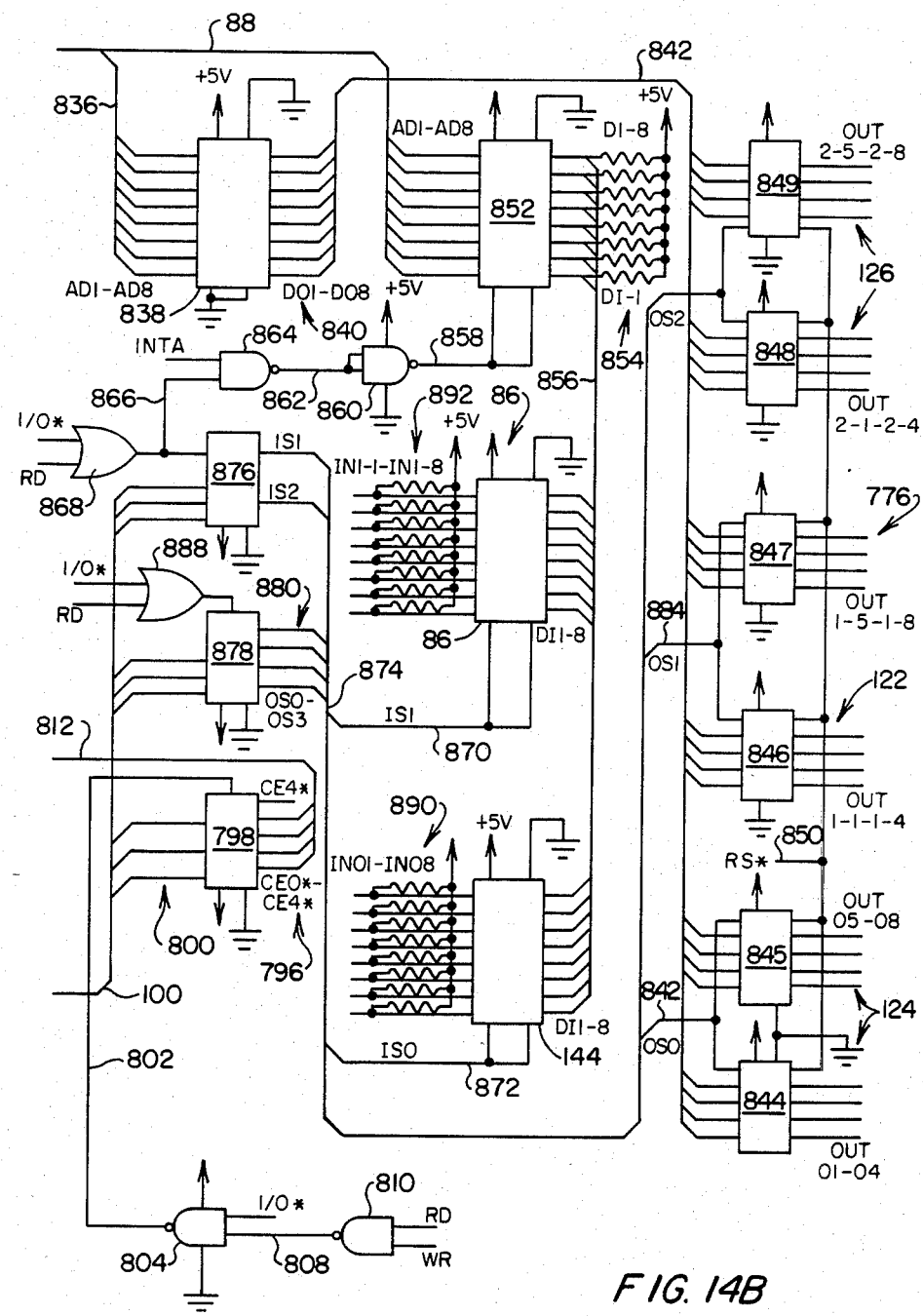

Referring to FIGS. 14A and 14B, the microprocessor function including memory switching buffers and latches as generally discussed in connection with FIG. 2 are revealed in more detail. To consider the related figures, FIG. 14A should be positioned to the left of FIG. 14B.

Referring to FIG. 14A, microprocessor 90 is reproduced. This microprocessor is a single chip, 8-bit, N-channel type coupled with a 5.5924 MHz oscillator 760 for carrying out internal control functions. The address and data terminals of microprocessor 90 are shown grouped at 762 along with the labels AD1–AD8 and A9–A16. Of these terminals, the leads thereto designated AD1–AD8 are directed in separate groupings of four lines at 764 and 766 to latches 768 and 770 which constitute the latching function 94 described in connection with FIG. 2. These latches may, for example, be provided as type 74LS175 four input latches marketed by National Semiconductor, Inc. and are enabled in common by signals ALE* and RS* asserted at 2-line grouping 772. The enabling signals are derived from the corresponding ALE and RST terminals of microprocessor 90 as provided at terminal grouping 774 and which are directed through 3-line bus 776 respectively through buffer 778 and buffer grouping 780. Buffers 778 and within grouping 780 may be provided, for example, as type 74LS04 marketed by National Semiconductor, Inc. The outputs of latch function 94 are provided at bus 96 which joins with bus 98 to form 16-line bus 100.

The non-volatile static RAM function 112 is reproduced in FIG. 14A as a combination of eight, 1024×1-bit components. These components are shown addressed from line grouping 114 extending, in turn, from bus 100. The memory function 112 is selectively disconnected or rendered transparent with respect to the data bus 88 by switching function 116. Two switch components 782 and 784 are shown within function 116 and may be provided, for example, as type 4016A marketed by National Semiconductor, Inc. Switch component 782 is addressed by address lines AD1–AD4, while switch component 784 is addressed by address leads AD5–AD8. The outputs of the switches leading to the memory function 112 are shown grouped at 118. Enablement of switches 782 and 784 occurs simultaneously by signal asserted from line 786 which leads through line 788 to an address location within function 134.

The random access memory (RAM) function 108 is reproduced in FIG. 14A as including two RAM components 790 and 792. These memories may be provided, for example, as type 2114 marketed by Intel Corp. and are associated with terminals AD1–AD8 through line grouping 110 of data bus 88. RAM function 108 is addressed with terminals A1–A10 from a line grouping 794 coupled with bus 100.

In similar fashion, ROM function 104 is reproduced in FIG. 14A as four discrete components, each of which is coupled to data leads AD1–AD8 from bus 88 as represented at 92 and the address leads thereto (A1–A13) are derived from bus 100. The memory components within function 106 may be provided, for example, as type 2764 ROMs marketed by Intel Corp.

The enablement of the various memory functions above described stems principally from the outputs CE0*–CE3* within a 4-line grouping 796 shown in FIG. 14B as extending from a one of ten decoder 798. Decoder 798 may, for example, be of a type 74LS42 marketed by National Semiconductor. The inputs to decoder 798 derive from bus 100 and are associated with microprocessor terminals A13–A16 as represented at line grouping 800. Enablement of decoder 798 is derived from line 802 extending from the output of inverter gate 804. Gate 804 is coupled to receive as inputs the IO* buffered output of microprocessor 90 line grouping 774 as buffered at 806 (FIG. 14A) in combination with the output signal at line 808 extending from inverter gate 810. The inputs to gate 810, in turn, receive the RD and WR signals from microprocessor 90 at line grouping 774. Four lines of the output of decoder 798, CE0*–CE3* are directed along bus 812 to the enable inputs of each of the ROMs within ROM function 104 (FIG. 14A). Enablement of RAM function 108 is provided by CE1K* and WR inputs thereto, the latter being derived from line grouping 774 at microprocessor 90 and the former being developed at output line 830 of OR gate 828. The input to gate 828 includes CE4* from decoder 798 in combination with the signal at address line 11 from bus 88.

NOVRAM function 112 is enabled by a chip select, $\overline{CS}$ signal asserted from line 822 and extending from AND gate 824. Gate 824, in turn, receives signals from earlier discussed line 788 as well as a signal at line 826 identified as CE2K*. The latter signal is derived from gate 816 at line 814 which is activated by a signal CE4* from decoder 798 as well as an input at line 818 extending from the output of inverter gate 820. Gate 820 is activated from signals at address line 811 of bus 88. NOVRAM function 112 enters an array recall mode by virtue of an $\overline{AR}$ signal asserted thereto from buffer 832, the input of which is coupled to the output of latch 124. A store mode of performance is achieved with the assertion of an $\overline{ST}$ signal thereto as labeled. This signal is derived from the output of buffer 834, the input to which receives the signals at leads 01-06 of noted latch 124. A strobe input providing for synchronization with the oscillator 760 of microprocessor 90 is asserted at NOVRAM function 112 as a WR signal extending from line grouping 774.

Output latch functions 122, 124 and 126 as described generally in FIG. 2 are shown in FIG. 14B with the same functional numeration. These output latches are associated with data bus 88, however, prior to their coupling thereto, leads AD1-AD8 thereof are diverted via bus 836 to an octal tri-state buffer 838. Buffer 838 correspondingly provides an 8-lead output D01 D08 at line grouping 840 which extends to form 8-lead bus 842. Bus 842, in turn, leads to the dedicated output ports identified as latching functions 124, 122 and 126. Looking more particularly to these ports, each may be provided, for example, as a type 74LS175 latch marketed by National Semiconductor, Inc., latch function 124 including output ports 844 and 845; latch function 122 including dedicated ports 846 and 847, while latching function 126 includes dedicated ports 848 and 849. The output terminals of port 844 are, as labeled OUT 01-04, while the outputs of port 845 are labeled OUT 05-08. Similarly, the outputs of port 846 are labeled OUT 1—1 to 1-4 while the outputs of port 847 are labeled OUT 1-5 to 1-8. Similarly, the outputs of port 848 are labeled OUT 2-1 to 2-4 while the outputs of port 849 are labeled OUT 2-5 to 2-8. By utilizing a tri-state buffer as at 838 in connection with the output latching function, loading down phenomena and the like may be avoided.

As described in connection with FIG. 2, data bus 88 also extends to buffer functions 86 and 144 which are reproduced in FIG. 14B. Bus 88, however, is intercepted by a transparent tri-state buffer 852 which is shown to receive as inputs the leads AD1-AD8. Buffer 852 may be present as the earlier-described type 74LS244 marketed by National Semiconductor, Inc. The outputs thereof are presented at line grouping 854 and are identified as DI-1 to DI-8 which are formed into a bus 856 leading to the inputs of buffers or dedicated input ports 86 and 144. Buffer 852 is enabled from line 858 which, in turn, corresponds with the output of an inverter (NAND) gate 860, the inputs to which are provided from line 862 extending, in turn, from the output of inverter (NAND) gate 864. Gate 864 is actuated by the presence of a signal designated INTA from line grouping 774 of microprocessor 90 as well as from line 866 extending from the output of OR gate 868. The inputs to gate 868 are as labeled the I/O* and RD signals derived, respectively, from buffer 806 and line grouping 774 (FIG. 14A).

Buffers or input ports 86 and 144 may be present, for example, as type 74LS240 marketed by National Semiconductor, Inc. (supra) and are enabled, respectively, from lines 870 and 872 in consequence of the presence of respective signals IS1 and IS0. These signals derive from bus 874 and, in particular, from the outputs of a decoder 876. Being, for example, of a type 74LS42 similar to decoder 798, decoder 876 is enabled from the output of OR gate 868 and is controlled by bus 100 lead designations A1-A3.

In similar fashion, output ports 844-849 are enabled by signals identified as OS0-OS3 emanating from a decoder or output enable latch 878. The latter signals are provided at output line grouping 880 of the decoder and extend along bus 874 to the enabling gates of the output ports. In this regard, lead OSO is directed to gates 844 and 845 at line 882; lead OS1 is directed to ports 846 and 847 at line 884 and the final lead carrying signal OS2 is directed to the enablement gates of output ports 848 and 849. The reset terminals of each of the output ports 844-849 are commonly connected by a line 850 which is arranged to receive the RS* signal from buffer grouping 780. This signal is provided at power up and serves to reset all of the ports 844-849 to zero to assure an avoidance of error at the commencement of utilization of instrument 10.

The inputs to decoder 878 are the leads A1-A3 of bus 100 and the decoder, which may be of type 74LS42 marketed by National Semiconductor, Inc. is enabled from the output of OR gate 888. Inputs to gate 888 derives from the signal I/O* of buffer 806 (FIG. 14A) and RD deriving from line grouping 774 (FIG. 14A). The outputs of dedicated input port 144 at line grouping 890 are identified as IN01-IN08 and are, in turn, directed to address function 134. Corresponding outputs at line grouping 892 for input port or buffer 86 are identified as being labeled IN1-1 to IN1-8 and are directed to the switching function 140.

It may be observed that line groupings 854, 890 and 892 as represented in FIG. 14B and grouping 774 in FIG. 14A are associated with pull up resistors coupled to +5 v. power supply in accordance with conventional design practice.

The serial out data, SOD, terminal of microprocessor 90 is utilized to develop an audible feedback signal with the actuation of switches 26 or 28. The terminal is coupled through line 894 to a piezoelectric transducer mounted within address function 134.

Figure 15:
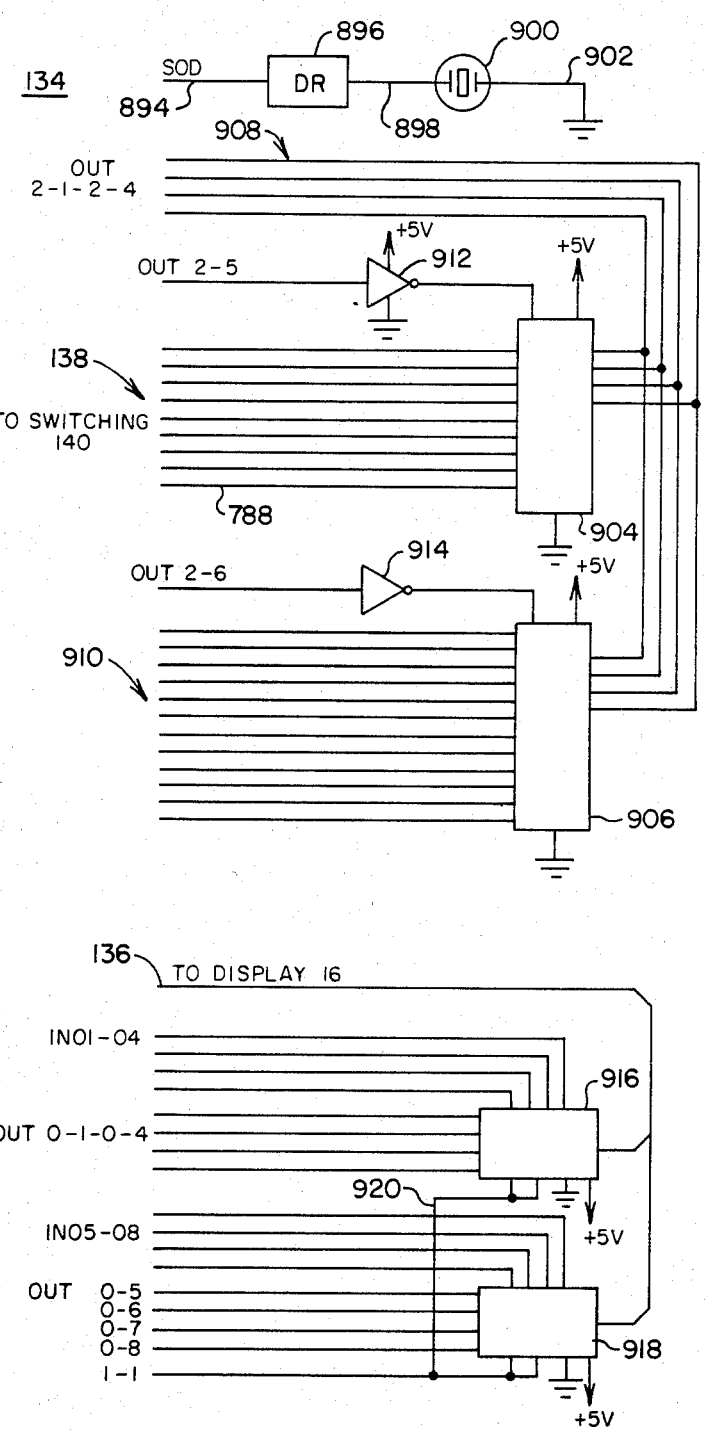
FIG. 15 is a schematic circuit diagram of the address function of the apparatus of the invention.

Turning to FIG. 15, the address function 134 is revealed at a higher level of detail. Line 894 is seen to be directed to the input of a conventional driver or amplification circuit 896, the output of which at line 898 drives acoustic transducer 900. The opposite side of transducer 900 at line 902 is shown to be coupled to ground.

Address function 134 is shown to include two 4-line to 16-line decoders 904 and 906. The inputs to these decoders are shown as a 4-line grouping 908 representing the outputs of output port 848 of latching function 124. The outputs from decoder 904 as represented by line grouping or bus 138 extend to the plurality of switching components described herein in connection with front panel 140 with the exception of line 788 which represents a non-volatile memory function 112 enablement signal. The outputs of decoder 906 are represented at line grouping 910 and are directed to various control and monitoring inputs of right and left channel tracking filter functions 66 and 68 as well as reference function 60. These inputs include the actuation of appropriate integrator switches, the collection of filtered data, monitoring of rpm and the like. Decoders 904 and 906 are enabled for sequential activation by microprocessor function 90 through respective output leads 2-5 and 2-6 of output port 849 (FIG. 14B). In this regard, output lead 2-5 is shown extending through an inverter 912 to the enabling input terminal of decoder 904, while output lead 2-6 of port 849 is shown to extend through inverter 914 to the corresponding terminal of decoder 906. Decoders 904 and 906 may be provided, for example, as a type 74154 marketed by National Semiconductor Inc.

FIG. 2 also shows a bi-directional communication between the address function 134 and display 16. Because displays as at 16 require an 8-bit bi-directional form of communication with microprocessor 90, two tri-state bus transceivers 916 and 918 are employed as shown in FIG. 15. Referring to that figure, one side of these transceivers is connected with earlier-described bi-directional bus 136 to display 16, while the microprocessor input thereto derives from output latching function 126 and input buffer function 144, the leads associated with these functions being labeled in correspondence with the labeling at FIG. 14B. The enabling inputs of transceiver 916 are coupled by line 920 in common with the corresponding terminals of transceiver 918 which, in turn, are connected with output port lead 1-1 of port 846. Transceivers as at 916 and 918 may be provided, for example, as type DS7839 marketed by National Semiconductor, Inc. (supra).

Figure 16:
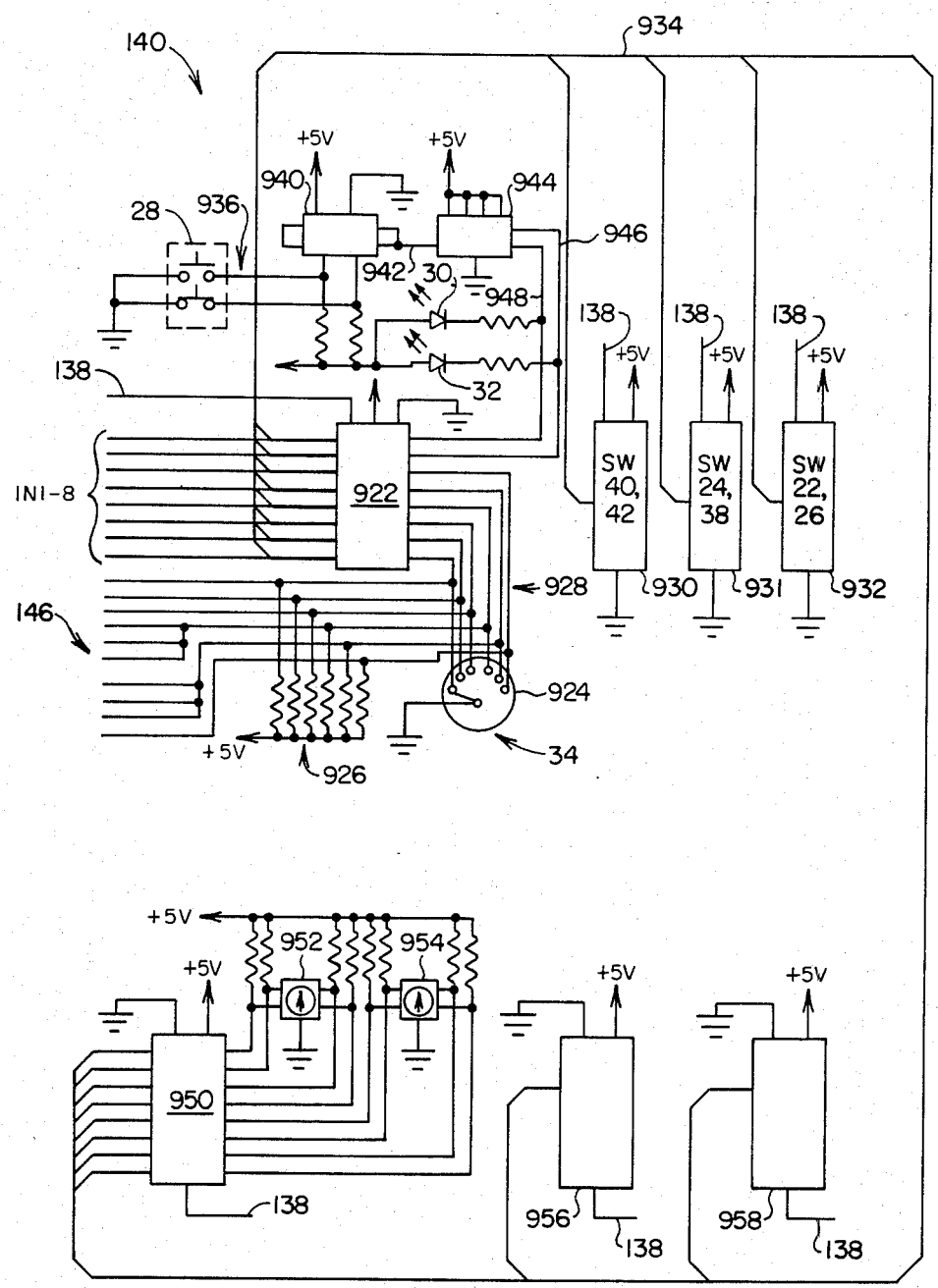
FIG. 16 is a schematic circuit diagram of the switching function of the apparatus of the invention.

Referring to FIG. 16, a schematic representation of switching function 140 is revealed. In the figure, two paired switch structures are shown, the remaining switches being represented in block form only inasmuch as they are substantially identically structured. With the exception of power switch 20, the switches at panel 14 are paired to operationally associated with a tri-state buffer which, for example, may be of a type 74LS240 marketed by National Semiconductor, Inc. The panel switch pair shown in detail in the figure are filter switch 34 and read/hold switch 28 operating in conjunction with a tri-state buffer 922. Looking to filter switch 34, the hand manipular contacts thereof are shown at 924 which are coupled with the earlier-described switch 34 components of the right and left channel tracking filter functions 66 and 68, as well as with the reference function 60 through earlier-described line grouping 146. The latter line grouping is held in a high state through resistor array 926 which is coupled with power supply. The contacts of switch 924 additionally extend as represented at line grouping 928 to the inputs of buffer 922. The corresponding outputs of buffer 922 are coupled to microprocessor 90 through input port 86. Buffer 922 is enabled by an appropriately addressed lead from bus 138 extending from decoder 904 of address function 134 (FIG. 15). Each of the switches 40, 42, 24, 38 and 22 is identically assembled in conjunction with tri-state buffers as are represented by blocks 930-932. These blocks are shown in assocation with 8-bit bus 934 which corresponds with the above-noted lead grouping IN1-IN8.

Tri-state buffer 922 additionally accommodates the operation of read/hold switch 28 which is represented schematically as DPDT switch in the drawing. The outputs of switch 28 at dual lines 936 are directed to a two input NAND buffer gate 940, the output of which at line 942 is directed to the clock input of a J-K flip-flop 944. The outputs of J-K flip-flop 944 at 946 and 948 are directed to the output terminals of buffer 922 to provide for microprocessor 90 surveillance. Additionally, however, earlier-described LEDs 30 and 32 representing, respectively, read and hold modes are coupled to these output lines and to +5 v. power supply. Thus, for an appropriate actuation of switch 28, a mode LED 30 or 32 will be energized. Reset switch 26 as represented at block 932 operates in identical fashion as above-described switch 28 with the exception of the presence of the LEDs.

Line grouping 934 also is seen to be directed to the input of another tri-state buffer 950 which forms one of the three substantially identical calibration or special function switching structures of unit 10. It may be recalled from FIG. 3 at block 180, that in the continuing scan of the switches of unit 10, the program checks for the positioning of a calibration switch to an on position. This switch which is so scanned for entry into the calibration subroutine shown in FIG. 11 is present as two BCD 4-bit switches 952 and 954 the outputs of which are coupled with tri-state buffer 950. Where any of the designated test numbers (01-08) are inserted by the calibrating technician through these switches, then the program will enter the calibration subroutine of FIG. 11. Where the switches read 0, 0, then the program will avoid the calibration subroutine. Enablement of the tri-state buffer 950 is provided by signal asserted from the line grouping 138 as discussed in connection with FIG. 15. Upon entry into a gain adjusting calibration procedure, as identified as calibration procedures 03-08 in FIG. 11, the operator inserts appropriate valuations into three BCD switches which are essentially identically operated in conjunction with tri-state buffers and the read/hold switch 28 is actuated to submit the inserted digital values into permanent memory function 112. Two of these remaining BCD switches are associated with one tri-state buffer identical to that at 950 and this switching function is represented at block 956. Similarly, the third adjustable BCD switch is associated with a tri-state buffer identical to that at 950 and this final switching input is represented schematically at block 958. With the arrangement, no potentiometers are required for gain adjustment or null accommodation, thus providing for simplified manufacture and maintenance.

Since certain changes may be made in the above system and apparatus without departing from the scope of the invention herein involved, it is intended that all matter contained in the above description or shown in the accompanying drawings shall be interpreted as illustrative and not in a limiting sense.

We claim:

1. Apparatus for balancing an identifiable rotor utilizing vibration responsive transducer means having vibration responsive output signals, rotation transducer means providing rotation responsive signals correspoding with a reference location of said rotor, and select utilization of a tral balance weight removably connectable with said rotor comprising:
    means for receiving said vibration responsive output signals;
    means for receiving said rotation responsive signals;
    analyzer nework means responsive to said vibration responsive output signals and to said rotation responsive signals, and including means defining a filter synchronous with respect to said rotation responsive signals for deriving vector categorized signals corresponding with amplitudes and phase of vibration with respect to said reference location;

hold switch means for selectively deriving a data accept condition;

function switching means actuable to effect a balance condition;

memory switching means actuable to effect store and recall conditions;

display means for providing a visible readout of information;

a random access memory;

non-volatile random access memory means for retaining balance parameter data at discrete identifiable locations in the absence of applied electrical power;

processor means responsive to first said vector categorized signals derived from an initial rotation of said rotor when said function switching means is in said balance condition and said hold switch means is in said data accept condition for effecting the submittal of said first signals to said random access memory, responsive to second said vector categorized signals derived from a next rotation of said rotor with said trial balance weight connected therewith when said function switching means is in said balance condition and said hold switch means is in said data accept condition for effecting the submittal of said second signals to said random access memory, for computing balance correction parameters with respect to said first and second signals, for effecting the readout of balance correction information corresponding therewith at said display means, and subsequently responsive to actuation of said memory switching means to said store condition for effecting the storage of said computed balance correction parameters in said nonvolatile memory means.

2. The apparatus of claim 1 in which said processor means is responsive to said memory switching means recall condition and said function switching means balance condition for effecting the transfer of select said computed balance correction parameters from said non-volatile memory means to said random access memory means, and is subsequently responsive to third said vector categorized signals derived from a third rotation of said rotor when said hold switch means is in said data accept condition for effecting the submittal of said third signals to said random access memory, for computing trim balance correction parameters with respect to said third signals and said balance correction parameters from said nonvolatile memory means, for effecting the readout of trim balance correction information corresponding therewith at said display means.

3. The apparatus of claim 1 in which said processor means is responsive in the presence of said function switching means balance condition to effect the readout of a first prompt message at said display means visually instructing a procedure sequence of causing said initial rotor rotation, actuating said hold switch means and terminating said initial rotor rotation, is responsive to a predetermined reduction of the rate of rotation of said rotor means to effect the readout of a second prompt message at said display means visually instructing a procedure sequence of adding a trial weight to said rotor, causing said next rotor rotation, actuating said hold switch means and terminating said next rotor rotation.

4. The apparatus of claim 1 in which said processor means is responsive to said memory switch means store condition in the absence of said function switch means balance condition to prevent the said effectuation of storage of data in said non-volatile random access memory means and to effect the readout of a corresponding instructional message at said display means.

5. The apparatus of claim 1 in which:

said memory switching means is actuable to effect a memory scan condition; and said processor means is responsive to said memory scan condition to effect a visual readout at said display means identifying each said discrete location of said non-volatile memory means and the data retaining status thereof in a sequentially recurring manner.

6. The apparatus of claim 1 in which:

said apparatus includes hand manipular calibrating switch means selectively adjustable to provide digitally categorized calibration outputs representing gain adjustment values for said analyzer network means; and said processor means is responsive to said digitally categorized calibration outputs for adjusting the values of said first and second vector categorized signals in conjunction with said computation of said balance correction parameters.

7. The apparatus of claim 1 in which:

said processor means is responsive to said memory switching means recall condition and said function switching means balance condition for effecting the transfer of select said computed balance correction parameters from said non-volatile memory means to said random access memory means, and is subsequently responsive to third said vector categorized signals derived from a third rotation of said rotor when said hold switch means is in said data output condition for effecting the submittal of said third signals to said random access memory, for computing trim balance correction parameters with respect to said third signals and said balance correction parameters from said non-volatile memory means, for effecting the readout of trim balance correction information corresponding therewith at said display means;

said processor means further being responsive in the presence of said function switching means balance condition to effect the readout of a first prompt message at said display means visually instructing a procedure sequence of causing said initial rotor rotation, actuating said hold switch means and terminating said initial rotor rotation, is responsive to a predetermined reduction of the rate of rotation of said rotor means to effect the readout of a second prompt message at said display means visually instructing a procedure sequence of adding a trial weight to said rotor, causing said next rotor rotation, actuating said hold switch means and terminating said next rotor rotation, said processor means being further responsive to the presence of said balance correction parameter within said random access memory for effecting the readout of a third prompt message at said display means instructing that trim balance procedures may be undertaken.

8. The apparatus of claim 1 in which:

said apparatus further includes acknowledge switching means actuable to effect a restart signal; and said processor means is responsive to said function switching balance condition and said hold switch data accept condition to effect an initial readout at said display means instructing the actuation of said acknowledge switching means, and is responsive to said vector categorized signals in response to said actuation effecting said restart signal.

9. The apparatus of claim 8 in which said processor means is responsive to said vector categorized signals only in response to at least two successive said acknowledge switching means actuations effecting said restart signal.

10. Apparatus for balancing a rotor and carrying out a vibrational analysis thereof utilizing vibration responsive transducer means having vibration responsive output signals; rotation transducer means having rotation responsive signals corresponding with a reference location of said rotor and utilization of a trial balance weight removably connectable with said rotor comprising:

means for receiving said vibration responsive output signals;
means for receiving said rotation responsive signals;
analyzer network means responsive to said vibration responsive output signals and to said rotation responsive signals and including:
counter means having a predetermined digital characterized output in response to pulse characterized input signals including said received rotation responsive signals;
trigonometric memory means retaining sinusoidal data and addressable by said counter means digital characterized output to derive first and second trigonometric outputs; and
multiplier means responsive to said received vibration responsive output signals and said first and second trigonometric outputs for deriving vector categorized signals corresponding with amplitudes and phase of vibration respect to said pulse characterized input signals;
hold switch means for selectively deriving a data accept condition;
memory switch means actuable to effect store and recall conditions;
oscillator means including a hand manipular component for generating a pulse train output at selected frequencies;
function switching means selectively actuable to effect a balance condition and a vibration readout condition, said vibration readout condition effecting the assertion of said oscillator means pulse train output to said counter means as said pulse characterized input signals and the exclusion of said rotation responsive signals;
display means for providing a visible readout of information;
a random access memory;
non-volatile random access memory means for retaining balance parameter data at discrete identifiable locations;
processor means responsive to first said vector categorized signals derived from an initial rotation of said rotor when said function switching means is in said balance condition and said hold switch means is in said data accept condition for effecting the submittal of said first signals to said random access memory, responsive to second said vector categorized signals derived from a next rotation of said rotor with said trial balance weight connected therewith when said function switching means is in said balance condition and said hold switch means is in said data accept condition for effecting the submittal of said second signals to said random access memory, for computing balance correction parameters with respect to said first and second signals, for effecting the readout of balance correction information corresponding therewith at said display means, and subsequently responsive to actuation of said memory switching means to said store condition for effecting the storage of said computed balance correction parameters in said non-volatile memory means, said processor means being responsive to said vector categorized signals in the presence of said function switching means vibration readout condition to compute vibration displacement values and phase thereof with respect to said reference location and said oscillator means output selected frequency, and for effecting the readout of said displacement and phase values at said display means as visually perceptible information.

11. The apparatus of claim 10 in which:
said apparatus includes display switching means actuable to effect an analog output condition; and
said processor means is responsive to said analog output condition for effecting the said readout of said displacement at said display means in bar chart format.

12. The apparatus of claim 10 in which said processor means is responsive to said memory switching means recall condition and said function switching means balance condition for effecting the transfer of select said computed balance correction parameters from said non-volatile memory means to said random access memory means, and is subsequently responsive to third said vector categorized signals derived from a third rotation of said rotor when said hold switch means is in said data accept condition for effecting the submittal of said third signals to said random access memory, for computing trim balance correction parameters with respect to said third signals and said balance correction parameters from said non-volatile memory means, for effecting the readout of trim balance correction information corresponding therewith at said display means.

13. The apparatus of claim 10 in which said processor means is responsive in the presence of said function switching means balance condition to effect the readout of a first prompt message at said display means visually instructing a procedure sequence of causing said initial rotor rotation, actuating said hold switch means and terminating said initial rotor rotation, is responsive to a predetermined reduction of the rate of rotation of said rotor means to effect the readout of a second prompt message at said display means visually instructing a procedure sequence of adding a trial weight to said rotor, causing said next rotor rotation, actuating said hold switch means and terminating said next rotor rotation.

14. The apparatus of claim 10 in which:
said memory switching means is actuable to effect a memory scan condition; and
said processor means is responsive to said memory scan condition to effect a visual readout at said display means identifying each said discrete location of said non-volatile memory means and the data retaining status thereof in a sequentially recurring manner.

15. The apparatus of claim 10 in which:
said apparatus includes hand manipular calibrating switch means selectively adjustable to provide digitally categorized calibration outputs representing gain adjustment values for said analyzer network means; and
said processor means is responsive to said digitally categorized calibration outputs for adjusting the values of said first and second vector categorized signals in conjunction with said computation of said balance correction parameters.

16. Apparatus for balancing a rotor utilizing vibration responsive transducer means having vibration responsive output signals, rotation transducer means providing rotation responsive signals corresponding with a reference location of said rotor, and utilizing a trial balance weight removably connectable with said rotor comprising:
means for receiving said vibration responsive output signals;
means for receiving said rotation responsive output signals;
analyzer network means responsive to said vibration output signals and to said rotation responsive signals, including means defining a filter synchronous with respect to said rotation responsive signals for deriving vector categorized signals corresponding with amplitudes and phase of vibration with respect to said reference location, said analyzer network means including components having predetermined gain and null effect operational requirements at identified locations;
hold switch means for selectively deriving a data accept condition;
function switching means actuable to effect a balance condition;
memory switching means actuable to effect store and recall conditions;
calibrating switch means selectively adjustable to correspond with said identified locations and to provide discrete digitally categorized calibration outputs with respect thereto;
display means for providing a visible readout of information;
a random access memory;
non-volatile random access memory means for retaining balance parameter and calibration data at discrete identifiable locations in the absence of applied electrical power; and
processor means responsive to first said vector categorized signals derived from an initial rotation of said rotor when said function switching means is in said balance condition and said hold switch means is in said data accept condition for effecting the submittal of said first signals to said random access memory, responsive to second said vector categorized signal, derived from a next rotation of said rotor with said trial balance weight connected therewith when said function switch means is in said balance condition and said hold switch means is in said data accept condition for effecting the submittal of said second signals to said random access memory, for computing balance correction parameters with respect tos aid first and second signals, for effecting the readout of balance correction information corresponding therewith at said display means and subsequently responsive to actuation of said memory switching means to said store condition for effecting said computed balance correction parameters in said non-volatile memory means, responsive to said digitally categorized calibration outputs and said hold switch means data accept condition to establish a calibration program mode for effecting the storage of said calibration outputs as data in said non-volatile memory means, said processor means recalling said stored calibration output data from said memory means for adjusting the values of said first and second vector categorized signals in conjunction with said computation of said balance correction parameters.

17. The apparatus of claim 16 in which said processor means is responsive to said memory switching means recall condition and said function switching means balance condition for effecting the transfer of select said computed balance correction parameters from said non-volatile memory means to said random access memory means, and is subsequently responsive to third said vector categorized signals derived from a third rotation of said rotor when said hold switch means is in said data accept condition for effecting the submittal of said third signals to said random access memory, for computing trim balance correction parameters with respect to said third signals and said balance correction parameters from said non-volatile memory means, for effecting the readout of trim balance correction information corresponding therewith at said display means.

18. The apparatus of claim 16 in which said processor means is responsive in the presence of said function switching means balance condition to effect the readout of a first prompt message at said display means visually instructing a procedure sequence of causing said initial rotor rotation, actuating said hold switch means and terminating said initial rotor rotation, is responsive to a predetermined reduction of the rate of rotation of said rotor means to effect the readout of a second prompt message at said display means visually instructing a procedure sequence of adding a trial weight to said rotor, causing said next rotor rotation, actuating said hold switch means and terminating said next rotor rotation.

19. The apparatus of claim 16 in which said processor means effects the display of said calibration outputs at said display means deriving said calibration program mode.

20. The apparatus of claim 16 in which:
said memory switching means is actuable to effect a memory scan condition; and
said processor means is responsive to said memory scan condition to effect a visual readout at said display means identifying each said discrete location of said non-volatile memory means and the data retaining status thereof in a sequentially recurring manner.

* * * * *